US006981222B2

(12) United States Patent
Rush et al.

(10) Patent No.: US 6,981,222 B2
(45) Date of Patent: Dec. 27, 2005

(54) END-TO-END TRANSACTION PROCESSING AND STATUSING SYSTEM AND METHOD

(75) Inventors: Gary W. Rush, Lafayette, IN (US); Herman J. Kiefus, Lafayette, IN (US); Christopher Clapp, Zionsville, IN (US); Helen Follett, Indianapolis, IN (US); David Griffith, Indianapolis, IN (US)

(73) Assignee: Made2Manage Systems, Inc., Indianapolis, IN (US)

( * ) Notice: Subject to any disclaimer, the term of this patent is extended or adjusted under 35 U.S.C. 154(b) by 553 days.

(21) Appl. No.: 09/928,863

(22) Filed: Aug. 13, 2001

(65) Prior Publication Data
US 2002/0054170 A1  May 9, 2002

Related U.S. Application Data

(63) Continuation-in-part of application No. 09/743,152, filed as application No. PCT/US99/24859 on Oct. 22, 1999.

(60) Provisional application No. 60/225,339, filed on Aug. 15, 2000, provisional application No. 60/105,287, filed on Oct. 22, 1998.

(51) Int. Cl.[7] ............................................... G09G 5/00

(52) U.S. Cl. ...................... 715/738; 715/740; 715/734; 715/854; 705/8; 705/26; 707/104

(58) Field of Search ................................ 345/853–855, 345/733–749, 760, 762; 705/8, 26, 27; 709/223, 709/227, 246; 707/1, 10, 102, 104.1, 104; 715/853–855, 715/733–749, 762, 760

(56) References Cited

U.S. PATENT DOCUMENTS 4,797,911 A  1/1989  Szlam et al.

(Continued)

OTHER PUBLICATIONS

Stevens, David P., "Building the perfect Platform", Wall Street & Technology, Jul., 1997, vol. 15, No. 7, p. 100-102.

(Continued)

Primary Examiner—Tadesse Hailu
(74) Attorney, Agent, or Firm—Doreen J. Gridley; Homer W. Fawcett, III; ICE MILLER

(57) ABSTRACT

A system and method for end-to-end transaction processing and statusing is disclosed. In one embodiment, an application server computer is used to house a variety of applications. An application accessed by a user converts a user request into an eXtensible Markup Language (XML) document. The application server computer uses a high level protocol to pass the XML document to a back office server which has access to a business' enterprise resource planning (ERP) database. The back office server performs the functions requested in the XML document, which may include complex database manipulations. Once the requested function has been performed, the back office server generates a response XML document which is passed to the application server computer using a high level protocol. The information within the response XML document is then presented to the user. According to one aspect of the invention, a navigational interface is provided which incorporates a hierarchical display of business documents based upon a dominant-subordinate relationship between the documents, the relationship between the documents being established according to a progression based on how documents are encountered in a typical business environment. The selection of a specific document constitutes the user request and the response comprises user specific information from the business entity ERP database.

7 Claims, 34 Drawing Sheets

U.S. PATENT DOCUMENTS

| | | | |
|---|---|---|---|
| 4,975,841 A | 12/1990 | Kehnemuyi et al. | |
| 5,325,290 A | 6/1994 | Cauffman et al. | |
| 5,357,439 A * | 10/1994 | Matsuzaki et al. | 700/96 |
| 5,434,394 A | 7/1995 | Roach et al. | |
| 5,463,555 A | 10/1995 | Ward et al. | 364/468 |
| 5,655,077 A | 8/1997 | Jones et al. | |
| 5,784,464 A | 7/1998 | Akiyama et al. | |
| 5,801,702 A | 9/1998 | Dolan et al. | 345/357 |
| 5,903,902 A | 5/1999 | Orr et al. | 707/517 |
| 5,923,328 A | 7/1999 | Griesmer | 345/357 |
| 5,931,917 A * | 8/1999 | Nguyen et al. | 709/250 |
| 5,958,012 A | 9/1999 | Battat et al. | 709/224 |
| 5,963,208 A | 10/1999 | Dolan et al. | 345/357 |
| 5,963,922 A | 10/1999 | Helmering | 705/35 |
| 5,966,707 A | 10/1999 | Van Huben et al. | 707/10 |
| 5,970,475 A | 10/1999 | Barnes et al. | |
| 5,974,416 A | 10/1999 | Anand et al. | |
| 5,982,891 A | 11/1999 | Ginter et al. | |
| 5,987,443 A | 11/1999 | Nichols et al. | 706/11 |
| 5,987,471 A | 11/1999 | Bodine et al. | 707/103 |
| 5,991,776 A | 11/1999 | Bennett et al. | 707/205 |
| 6,012,098 A * | 1/2000 | Bayeh et al. | 709/246 |
| 6,023,684 A | 2/2000 | Pearson | |
| 6,026,429 A | 2/2000 | Jones et al. | |
| 6,044,155 A | 3/2000 | Thomlinson et al. | |
| 6,047,264 A | 4/2000 | Fisher et al. | |
| 6,047,376 A | 4/2000 | Hosoe | |
| 6,064,990 A | 5/2000 | Goldsmith | |
| 6,067,559 A * | 5/2000 | Allard et al. | 709/202 |
| 6,088,796 A | 7/2000 | Cianfrocca et al. | |
| 6,092,199 A | 7/2000 | Dutcher et al. | |
| 6,092,203 A | 7/2000 | Ooki et al. | |
| 6,119,102 A * | 9/2000 | Rush et al. | 705/29 |
| 6,457,066 B1 * | 9/2002 | Mein et al. | 719/330 |
| 6,615,258 B1 * | 9/2003 | Barry et al. | 709/223 |

OTHER PUBLICATIONS

Feibus, Andy, "ActiveReports: New Pick for VB Developers", Informationweek, May 11, 1998, No. 681, p. 6A-12A.

The Windows Sources catalog (Buyer Guide), Gale Group Computing, Sep., 1993.

Managing Your Money for Windows, User's Guide, MECA Software, Inc. 1994. pp. 1-32, 89-92, 112-113, 122-123, 222, 231, 237-238, 243-251.

NETSCAPE 3.0, Mark R. Brown, Complete Reference Using Netscape 3.0 pp. 204-209; 590-597, 1996.

* cited by examiner

END-TO-END TRANSACTION PROCESSING AND STATUSING SYSTEM AND METHOD

This application is a continuation-in-part of co-pending U.S. application Ser. No. 09/743,152 filed Jan. 5, 2001 which is based on International Application No. PCT/US99/24859, filed Oct. 22, 1999 by Made2Manage Systems, Inc., based upon U.S. application Ser. No. 09/237,631 for a NAVIGATIONAL INTERFACE FOR ERP SYSTEM, based upon U.S. Provisional Application 60/105,287 filed Oct. 22, 1998 and claims the benefit of U.S. Provisional Application 60/225,339, filed Aug. 15, 2000.

FIELD OF THE INVENTION

The present invention relates to a system and method for end-to-end transaction processing and statusing for procurement of goods and/or services in client-server and N-tier network environments, such as the Internet and/or private "Intranets," and more particularly, to a network based system providing a virtual marketplace in a make-to-order (MTO), make to stock (MTS), engineer to order (ETO), assemble to order (ATO) or mixed mode manufacturing environment.

BACKGROUND OF THE INVENTION

The computer has evolved to have a pervasive presence in the present culture. This is due, at least in part, to the availability of more efficient, reliable and cost-effective computers. An additional evolution has occurred with respect to the ability to network computers together such that resources such as, but not limited to, information, data, email, services, tools and software, can be made available to, and passed between, a number of users regardless of the geographic location or platform of the users. Of course, the networks may be further linked to other networks thereby providing even broader capabilities.

The Internet is a well-known collection of such networks (e.g., public and private data communication and multimedia networks) that have been linked using common protocols to form a world wide network of networks. The World Wide Web (hereinafter the "Web") was created in the late 20$^{th}$ Century, and is comprised of many Internet sites (computers connected to the Internet) having hypertext documents or "Web pages" that can be accessed by users via a "browser" program. When viewed via a browser, a Web page typically displays text and color graphics, and can play sound, animation, and video clips. Web pages, written in Hypertext Markup Language (HTML), contain hypertext links (usually highlighted keywords) that provide access to other Web pages, is even those on other Internet sites. When a user selects a particular hypertext link, the Web browser reads and interprets the address, called a Uniform Resource Locator ("URL") associated with the link and then connects the user's computer with the Internet site (computer) at that address. A URL gives the type of resource being accessed and optionally the path of the file sought. For example: resource://host.domain/path/filename, wherein the resource can be "file", "http", "gopher", "WAIS", "news", or "telnet".

One major attraction of the Web from a user perspective has historically been its ease of use, especially for the novice computer user. With a click of the mouse, even a novice had the ability to cruise this information highway. Using any of the available search engines and a universal client tool known as a browser, one can easily access a wide variety of information sources. The Web, and the growing number of users, was quickly recognized as a potential market for entrepreneurs. The Web has subsequently become a significant outlet for businesses offering information and services to potential customers.

Frequently, a business sets up a home page on the Web. The home page constitutes an electronically-addressable location that may be used for promoting and advertising a business, among other purposes. Potential electronic customers use Web browsers to access the information offered on those Web sites. However, computer technology, related to both hardware and software, has revolutionized the way business is conducted and expanded the use of the Web. While business was once conducted in large part based on confidence in the individual or company selling a service or a product, the speed with which information may be accessed has created a marketplace which is increasingly driven by availability of information. This is evidenced, in part, by the burgeoning volume of so-called "E-commerce".

"E-commerce" comprises Internet based business transactions. This type of transaction is generally characterized by the lack personal contact between the parties to a transaction. Consequently, business is conducted between the "on-line personae" of the parties to a transaction, thus creating a virtual marketplace. In the virtual marketplace, availability of information and ease of access to that information becomes paramount. For example, a consumer shopping for a wristwatch may obtain information regarding a number of watches from a number of manufacturers. Once the consumer has selected a particular model of watch, the consumer may research retail sources for the watch, critically assessing information such as availability and price. Typically, if a source does not provide this information, the consumer will merely eliminate the source, and proceed to a different source. Moreover, if the information is presented in a Web site which is difficult to navigate or which is frequently unavailable, the consumer is likely to become frustrated and proceed to a different source. Once the consumer has placed an order, there remains a need for timely information. The consumer frequently desires to know when to expect that the product will be received. Thus, providing the consumer with timely information in a reliable and easy to use interface is critical to competing in the virtual marketplace.

Of course, to conduct business on the Web, both parties must be uniquely identified. One example of creating this unique relationship is available at http://interactive.wsj.com/home.html, where the Wall Street Journal provides a "personalized journal" to each user. In order to open an account, the user typically has to complete a form electronically, providing a user name, a password, an electronic-mail ("e-mail") address, etc. The latter is often used by the Web site to send back information not provided on the Web site itself to the user. In the case of the Wall Street Journal site, the user must open an account, and then create Personal Journal setting which creates customized news folders.

Because of the unique expertise required to properly maintain a Web site which is up-to-date and easy to use, many business enterprises opt to have their Web site hosted by other entities. Under this type of hosted approach (normally referred to as an Application Service Provider (ASP) approach), the entire contents of a business' Web site is maintained at the ASP location. When a business wishes to make data, such as customer account information, available to its customers, this data is also maintained at the ASP location. The hosting of a Web site, however, becomes increasingly expensive as the data storage requirements increase. Additionally, because the ASP provides services to a number of business enterprises, and each business enterprise and customer relationship must be uniquely identified and tracked as described above, system complexity increases for each additional Web site hosted. Furthermore, it becomes increasingly likely that the data hosted by the ASP will not match the data on the business enterprise's database, either due to update errors or as a result of a time difference between updates of the ASP databases and information requests. Of course, even routine maintenance of the ASP database presents additional difficulties. It would be beneficial, therefore, to have a system which does not require maintenance of undesired data at the ASP server. It would be further beneficial if the system allowed for access to data from the business enterprise's database on a real-time basis.

An alternative ASP approach to hosting redundant databases site is to maintain the business' data in a single database at the ASP site. This alternative, while addressing some of the shortcomings of redundant databases, has at least two major shortcomings. First, access to the data by the business' employees constrained by the bandwidth available between the business and the ASP. Therefore, access to the database can be a slow, tedious process. Alternatively, a larger bandwidth connectivity requires significant outlay in capital investment and normally results in wasted capacity over a given period of time. A second shortcoming is that the business loses control of mission sensitive data. Because the data is housed outside the four walls of the business, there is an increased chance of corruption or compromise. Thus, business risk is increased.

As applied to the make-to-order (MTO), make to stock (MTS), engineer to order (ETO), assemble to order (ATO) or mixed mode manufacturing industry, the virtual marketplace presents a number of additional challenges. Providing a customer with an estimated delivery date is one such challenge. Depending on the product, there may be no standard delivery date because each product must be specially manufactured, and may include unique manufacturing steps. Thus, the time required to manufacture, engineer or assemble a product will depend on a number of factors. Some of these factors may include, for example, the availability of a base unit, availability of special components, paints or materials, availability of specific processing equipment, the present workload at the factory, etc. All of these factors are subject to change on a day-by-day, or even an hour by hour, basis. Problems may be further compounded by the desire to maintain minimum inventory of stock on hand to avoid, amongst other things, warehousing costs.

Additional challenges arise when a product must be manufactured according to design criteria unique to a particular customer. In this scenario, technically correct and complete design criteria must be passed to the manufacturer for evaluation of cost impacts. Frequently, a customer will desire a breakdown of the cost for a product on a feature by feature basis to perform a cost analysis. Additionally, the customer may desire an understanding of which features would delay delivery of a product. Obviously, each of these represent another piece or set of information which may be desired by a potential customer, and each may change in a very short span of time. In essence, the information desired by a potential customer comprises the information used by the manufacturing company in doing enterprise resource planning (ERP).

ERP software, such as that known as MADE2MANAGE® software offered by MADE2MANAGE Systems, Inc., has been a significant advance for businesses. Prior to ERP software, a business would generally use different software applications to automate different functional departments of a business. For example, accounting, order entry, manufacturing, inventory and shipping departments would each use their own software systems. While these individual departments can achieve improved operational efficiency through software, the business as a whole would not realize the potential afforded by information technology because the individual software applications may not smoothly interface with each other, and there could be significant duplication of data across the individual systems.

With ERP software, all of the different functional applications for a business may share a common database or databases, so all data is entered only once. Moreover, there is a seamless integration of data between disparate applications, so data generated by one application can be immediately used by any other application. Due to the use of a comprehensive database, ERP systems permit enhanced analysis of a business' data. Storage and maintenance of a duplicate ERP databases, however, may be relatively expensive, and errors between databases can create dissatisfied customers and lost business.

Because ERP systems provide such comprehensive access to a business' data, they frequently suffer from the additional shortcoming of having an end user interface that is difficult to learn. Generally, nearly every person in every operational department uses the ERP system, even though each user only accesses a small portion of the data in the entire ERP system. This tends to make ERP user interfaces inherently complicated, particularly for end users that need to access information outside of the end user's normal area of expertise. For example, while a sales person may become proficient in accessing quotation or sales order information in an ERP system, if customer asks the sales person a question about the shipment or invoice for a particular order, the ERP user interface will usually make it difficult for the sales person find the information, because the user interface for shippers and invoices is likely to be unfamiliar to the sales person. Obviously, this problem is would be exacerbated if the customer of the business were to attempt to retrieve information as to the customer's account or order without assistance from the sales person.

There exist a number of approaches for addressing some of the above problems. U.S. Pat. No. 5,974,416, Anand et al., discloses a method of creating a tabular data stream format. The method and tabular data of Anand et al. uses the Simple Object Access Protocol (SOAP) as an application layer protocol layered on top of Hypertext Transport Protocol (HTTP) so that business automation objects may be accessed and methods invoked over the Internet through Web Servers. In use of the system, Anand et al. contemplates retrieval of information from a server based on a query generated from a client computer. Creating a system according to Anand et al., however, requires a significant level of technical support and requires a significant capital investment in hardware and programming. Additionally, Anand et al. does not address the challenges present in a manufacturing environment. Furthermore, Anand et al. does not disclose how to present the information in a manner which is easy to understand and easy to use.

U.S. Pat. No. 6,088,796, Cianfrocca et al., discloses a secure middleware and server control system for querying through a network firewall. According to Cianfrocca et al., a communication server receives queries from a user and transmits replies to the user. The request is then passed through a firewall to application servers with database connections. Cianfrocca et al. claims that this structure is particularly adapted to large application systems in which data needed for appropriate response to user inquiry is located in remote sites, such as for a bank loan Web site application which of accesses student loan information stored on a plurality of database servers. Cianfrocca et al. thus discloses the use of a first server as a means for a user obtaining information resident on a second server in a commercial setting. Cianfrocca et al. does not, however, address the challenges present in a manufacturing environment. Furthermore, Cianfrocca et al. does not disclose how to present the information in a manner which is easy to understand and easy to use.

U.S. Pat. No. 6,047,264, Fisher et al., discloses a method for automatic notification of customers as to the status of their orders and shipments. The system of Fisher et al. periodically interrogates information systems to obtain status of orders and shipments. When a change in status is detected, a message is generated, such as by email, to notify the customer of the change in status. Fisher et al. thus discloses an automatic system for providing status to a customer concerning orders and shipments by periodically polling remote systems. Fisher et al. does not, however, address the challenges present in a manufacturing environment, such as calling for complex database manipulations across foreign systems. Furthermore, Fisher et al. does not disclose how to present the information in a manner which in easy to understand and easy to use.

U.S. Pat. No. 6,023,684, Pearson, discloses a system for interfacing client programs to legacy databases in financial institution computer systems. The system of Pearson stores in local memory certain information concerning a user's account in a remote legacy system. When queried by the user over the Internet, the system provides data to the user either from the local memory or by accessing the legacy system in real time. Pearson thus discloses real time reporting of customer account status in response to queries from a user, where user account information is obtained by accessing a remote database in response to a query over the Internet. Pearson does not, however, address the challenges present in a manufacturing environment. Furthermore, Pearson does not disclose how to present the information in a manner which is easy to understand and easy to use.

U.S. Pat. No. 5,694,551, to Doyle et al., discloses a computer-based system for placing orders, tracking shipment, and invoicing, including orders placed with multiple suppliers. Doyle et al. discloses that the order may be filled internally (by the system owner) or by external suppliers. According to the system of Doyle et al., the master item catalog is updated with information received from the suppliers. Prices are then taken from the database, and vendors are selected by the user. The system of Doyle et al. is thus limited to a relatively small set of information from various vendors including pricing data in the master item catalog. Doyle et al. does not, however, address the challenges present in a manufacturing environment. Furthermore, Doyle et al. does not disclose how to present the information in a manner which is easy to understand and easy to use.

U.S. Pat. No. 4,992,040, to Dworkin, discloses a system that allows the user to shop for products using product specifications. The user can also select a supplier for a particular item to be purchased. In support of the system, a relational database is provided. The relational database is a collection of catalog information from various vendors. The system of Dworkin thus permits a user to procure products from a choice of multiple suppliers utilizing a relational database of multiple supplier information. Dworkin does not, however, address the challenges present in a manufacturing environment. For example, Dworkin does not disclose a user submitting product specifications to a manufacturer in order to obtain information. Furthermore, Dworkin does not disclose how to present the information in a manner which is easy to understand and easy to use.

As is evident from these systems, what is needed, therefore, is a transaction and statusing system which may be used in a virtual marketplace for a manufacturing concern. Advantageously, the system should allow a customer to submit design criteria for a make-to-order product. The system should also provide an easy to use and easy to understand interface so that a user may automatically retrieve information concerning accounts and orders. The system should not require extensive technical support at the manufacturing company location. The system should not require excessive investment in hardware and software. It is further desired that the system not duplicate resources required for ERP.

SUMMARY OF THE INVENTION

In one embodiment, the invention is housed on the Internet. A Web site or enterprise portal for a business entity is created and maintained on an Application Service Provider (ASP) server. The Web site allows customers desiring information or to perform a transaction to access various applications which are used in providing services in e-commerce. According to one embodiment, a customer accessing the Web site by means of an Internet browser is presented with a navigational interface. The navigational interface comprises representations of business documents in an hierarchical tree which is predefined according to the sequence in which those business documents are normally encountered in a business setting. Thus, a customer navigates to specific information in a quick and intuitive manner. Such an interface is disclosed in International Application No.: PCT/US99/24859, filed Oct. 22, 1999 by Made2Manage Systems, Inc., based upon U.S. application Ser. No. 09/237,631 for a NAVIGATIONAL INTERFACE FOR ERP SYSTEM, assigned to Made2Manage Systems, Inc., the contents of which are hereby incorporated by reference.

In a make-to-order manufacturing environment, the information request or transaction may be initiated at the design stage of a product. Thus, the invention comprises a document collaboration capability (DCC), which may be used by the customer to deliver specific design criteria, such as, but not limited to, computer-assisted drawings (CAD) or specification documents, to the manufacturer. The invention further provides for marketing, financing, ordering, accounting, training and reporting while providing an on-line catalog.

The information accessed by the customer is not maintained on the ASP server. Rather, in this embodiment of a hybrid-hosted architecture, the ASP server utilizes a simple object access protocol (SOAP) to make procedural calls and transmit extensible markup language (XML) formatted data across the Internet to components on remote systems. In response to the procedural call, the remote system executes the appropriate function. In one embodiment, the function may be a query or update of the business entity's database which is housed at a location remote from the ASP server, such as may be part of an enterprise resources planning system. Thus, the customer is it provided access directly to the business' most recent information. The information is then transferred to the ASP server, and presented to the customer. Thus, a customer is provided with real-time information. This is accomplished without the need for the manufacturer to fully incur additional expenses for web expertise, custom programming, significant infrastructure, excess bandwidth or up front capital costs.

BRIEF DESCRIPTION OF THE DRAWINGS

FIG. 9I shows an exemplary complete order page which is displayed when the complete the order button of FIG. 9H is selected by the user.

FIG. 9I' shows the bottom portion of the exemplary complete order page of FIG. 9I.

DETAILED DESCRIPTION

Figure 1:
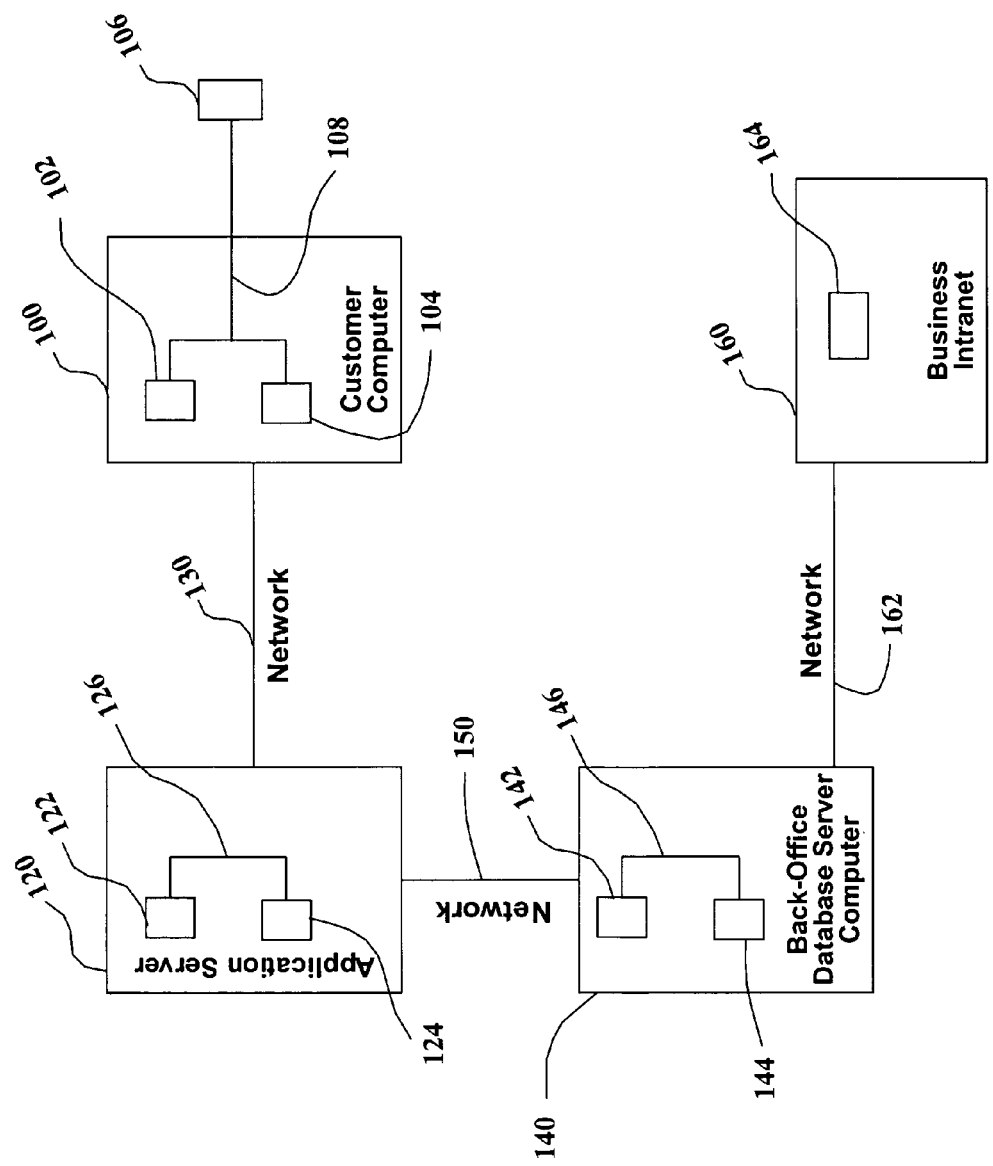
FIG. 1 shows a high level architectural view of a network comprising a customer computer, an application server computer and a back-office database server computer.

Referring initially to FIG. 1, a high level architectural view of a customer computer, an application server computer and a back-office database server computer such as may be found within the Internet or an intranet with which the principles of the present invention may be suitably used to provide an end-to-end transaction processing system according to the present invention is illustrated. As used herein, the term "customer" will be understood to comprise an entity desiring information from a business, including an entity wishing to enter into a transaction with that business, whether or not that entity has a pre-existing relationship with the business. Typical businesses may comprise, for example, make-to-order businesses which provide products according to specifications provided by a customer. Customer computer 100 comprises CPU 102, memory 104 and display monitor 106 connected together by bus 108. Memory 104 stores browser software to communicate with application server computer 120. Application server computer 120 comprises CPU 122 and memory 124 connected by bus 126. Memory 124 stores application server software, such as, for example, application software, Hypertext Transfer Protocol (HTTP) software, Simple Object Access Protocol (SOAP) software, and eXtensible Markup Language (XML) software, as well as data and other software associated with resources resident on application server 120. Customer computer 100 and application server computer 120 are linked together by a network 130. Back-office database server computer 140 comprises CPU 142 and memory 144 connected by bus 146. Memory 144 stores back-office database server software, such as, for example, Internet Information Service (IIS) software and an internet server application program interface (ISAPI) dynamically linked library (DLL), as well as data and other software associated with resources resident on back-office database computer 140. Application server computer 120 and back-office database computer 140 are linked together by a network 150. In the embodiment of FIG. 1, back-office database computer 140 is further linked to business intranet 160 by network 162, so as to provide access to ERP database 164. Those of skill in the applicable art will recognize that a variety of alternatives for the network may be used in conjunction with the present invention using a variety of networks and servers, those alternatives being within the scope of the present invention.

Figure 2A:
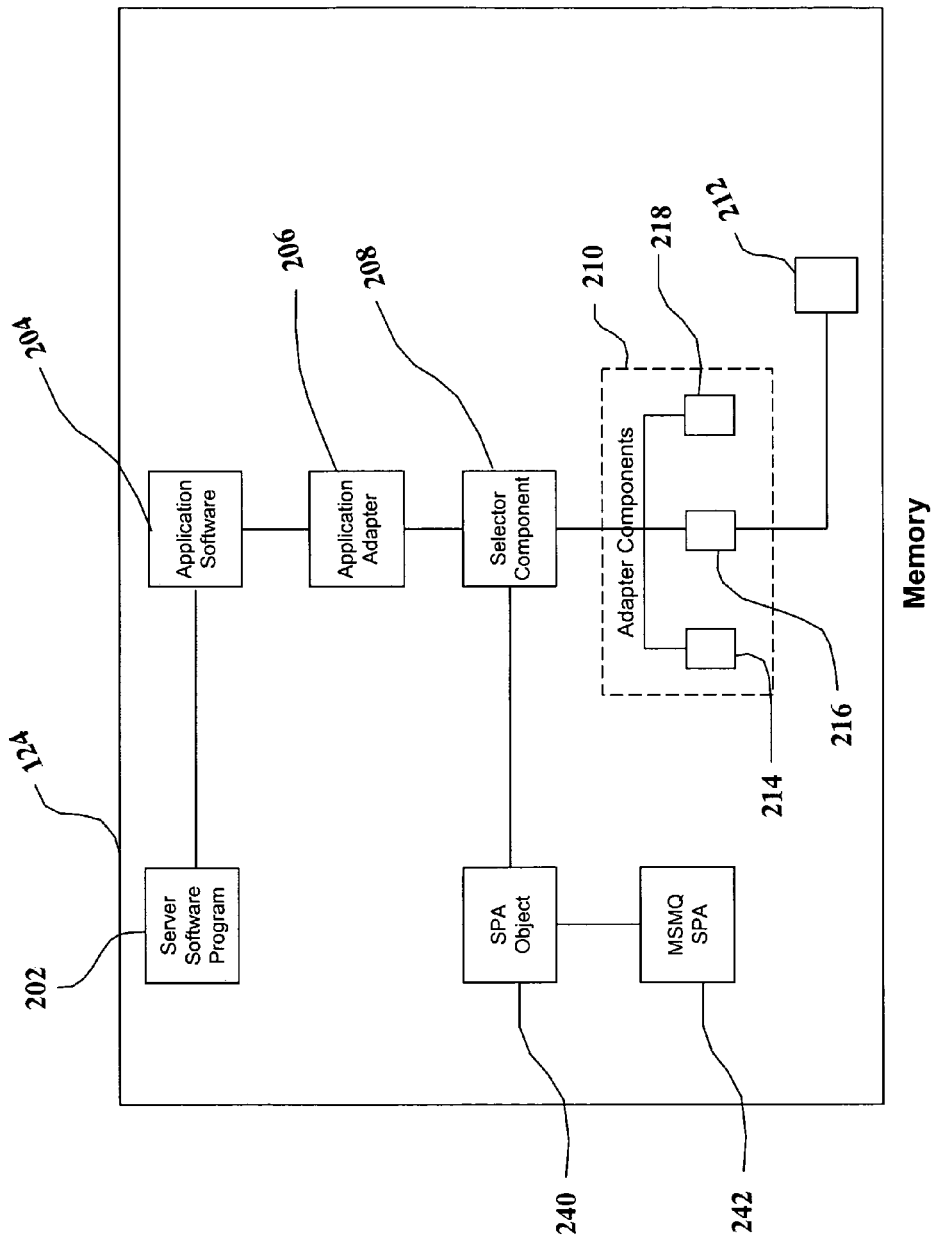
FIG. 2A shows a high level architectural view of files and modules of software programs within the memory of the application server computer of FIG. 1

Referring now to FIG. 2A, a high level architectural view of files and modules of software programs within memory 124 is illustrated. Within memory 124, server software program 202, which may be of the type Active Server Page (ASP) program, resides in application server computer 120 and processes data submitted from customer computer 100. After processing the data, server software program 202 returns newly processed or updated information, such as a new Hypertext Markup Language (HTML) document, to application server computer 120 which sends the new information via browser software of customer computer 100 to be displayed on monitor 106 of customer computer 100.

Those of ordinary skill in the art will recognize that software modules such as described above are well known in the art and can easily be written and/or modified to implement other Web creation and maintenance methods. Furthermore, while the embodiment of FIGS. 1 and 2A describes the present invention using only one application server, in consideration of the disclosures herein, those of skill in the art will recognize that the present invention may be practiced in environments comprising a plurality of application servers, with various support functions allocated to each server. These and other embodiments being within the scope of the present invention.

Figure 2B:
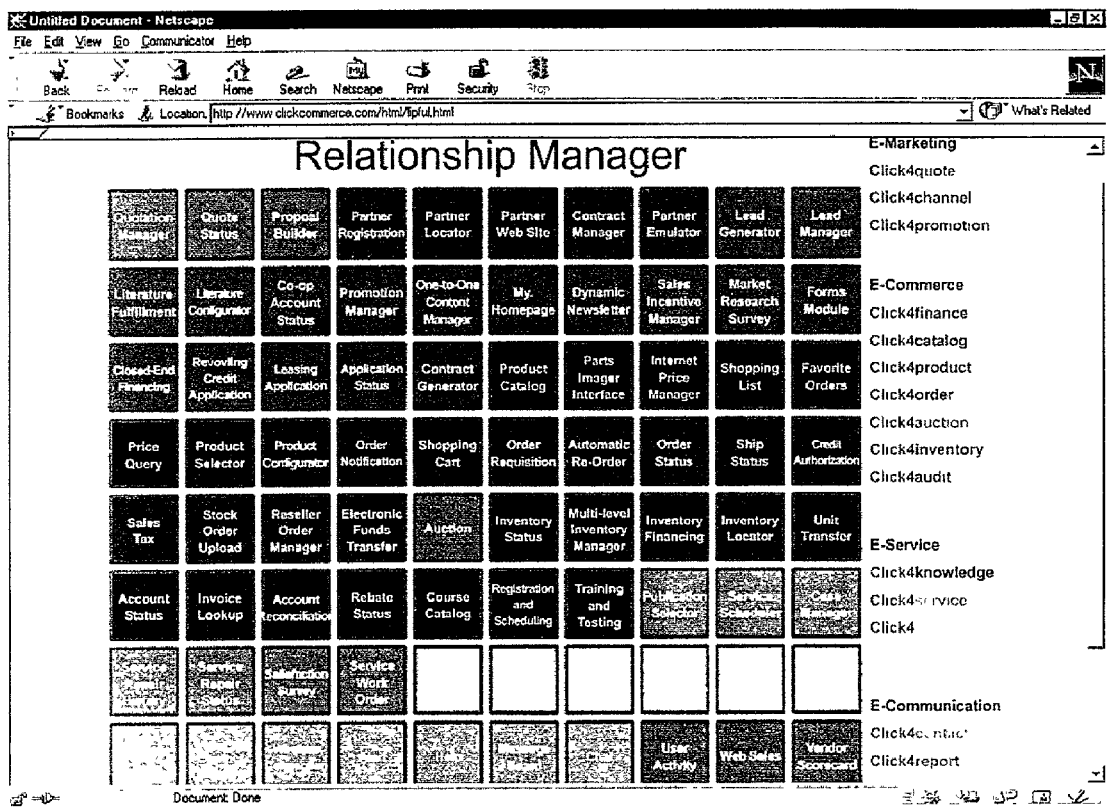
FIG. 2B shows an illustration of application modules within the application server of FIGS. 1 and 2.

Memory 124 further comprises application software 204. These applications are provided by the ASP for use by the customers of the business enterprise. FIG. 2B is an illustration of an exemplary suite of applications. Also located within memory 124 is software needed to communicate customer requests, and to receive information from, back-office database server computer 140. In this embodiment, this comprises application adapter 206, selector component 208, adapter components 210 and rope proxy 212. These software modules process a request for information submitted through application software 204 into a SOAP call which can be transmitted over the internet to back-office database server computer 140. Accordingly, the proxy object, in this embodiment, facilitates communication to SOAP exposed objects using HTTP POST and GET. SOAP is used to transfer information and procedural requests between systems connected by networks, even if the systems use different operating systems (foreign systems). SOAP accomplishes this using XML. In simple terms, XML provides a structured syntax for the storage and delivery of information, even highly complex information. Thus, an XML document provides a means for transferring highly complex information across networks between foreign systems. Therefore, an XML based system may pass instructions for complex database manipulations between systems connected by networks, even between foreign systems.

Figure 3:
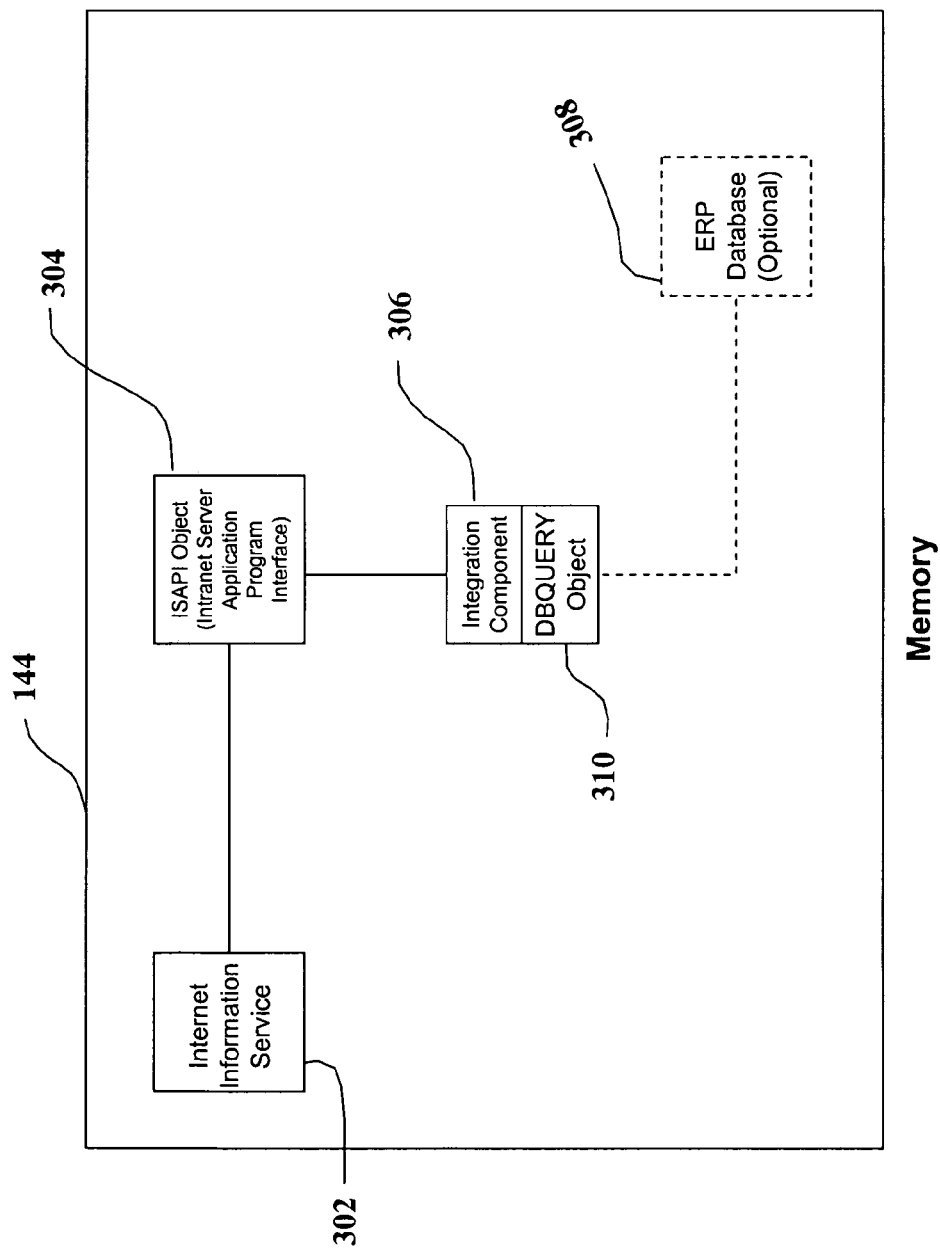
FIG. 3 shows a high level architectural view of files and modules of software programs within the memory of the back-office database server computer of FIG. 1.

Calls from application server computer 120 are received by back-office database server computer 140. Memory 144 of back-office database server computer 140 comprises software modules for receiving and processing the calls from application server computer 120. Referring now to FIG. 3, which is a high level architectural view of files and modules of software programs within memory 144, software modules include IIS 302, ISAPI Object 304 and integration component 306 which comprises DBQuery object 310. According to the embodiment of the invention illustrated in FIG. 1, ERP database 164 is located in intranet 160. Of course, in consideration of the disclosures herein, those of skill in the art will recognize that the present invention may be practiced in environments wherein the ERP database is located in back-office database server computer 140. This alternate embodiment is illustrated in FIG. 3 by optional ERP database 308.

Referring to FIG. 2A, operation of one embodiment of the present invention is described. A customer accessing application software 204 makes a request for data. According to one embodiment of the invention, this request is effected by selecting a representation of a business document which is displayed to the customer as will be discussed below. The request is received by server software program 202, which processes the request and accesses application software 204. Application software 204 translates the request into an XML message which is passed to application adapter 206. Also passed to application adapter 206, is an XML header node containing identification information for uniquely identifying back-office database server computer 140. This information may include the business entity's IP address, a unique identifier for the customer, and a unique identifier for the particular customer user accessing the application. As is well known in the art, once a unique user is identified, such as by means of a password, the information which is accessed by that user may be controlled.

Application adapter 206 receives the XML header node and XML request message, and combines them into a single XML document which is then passed to selector component 208. Selector component 208 reads the header node information in the XML document and sends the XML document to adapter components 210. Based upon the back-office database identification and version attributes in the header, the XML document is routed to either VFP adapter 214, SQL adapter 216 or 3.2 adapter 218.

Figure 2C:
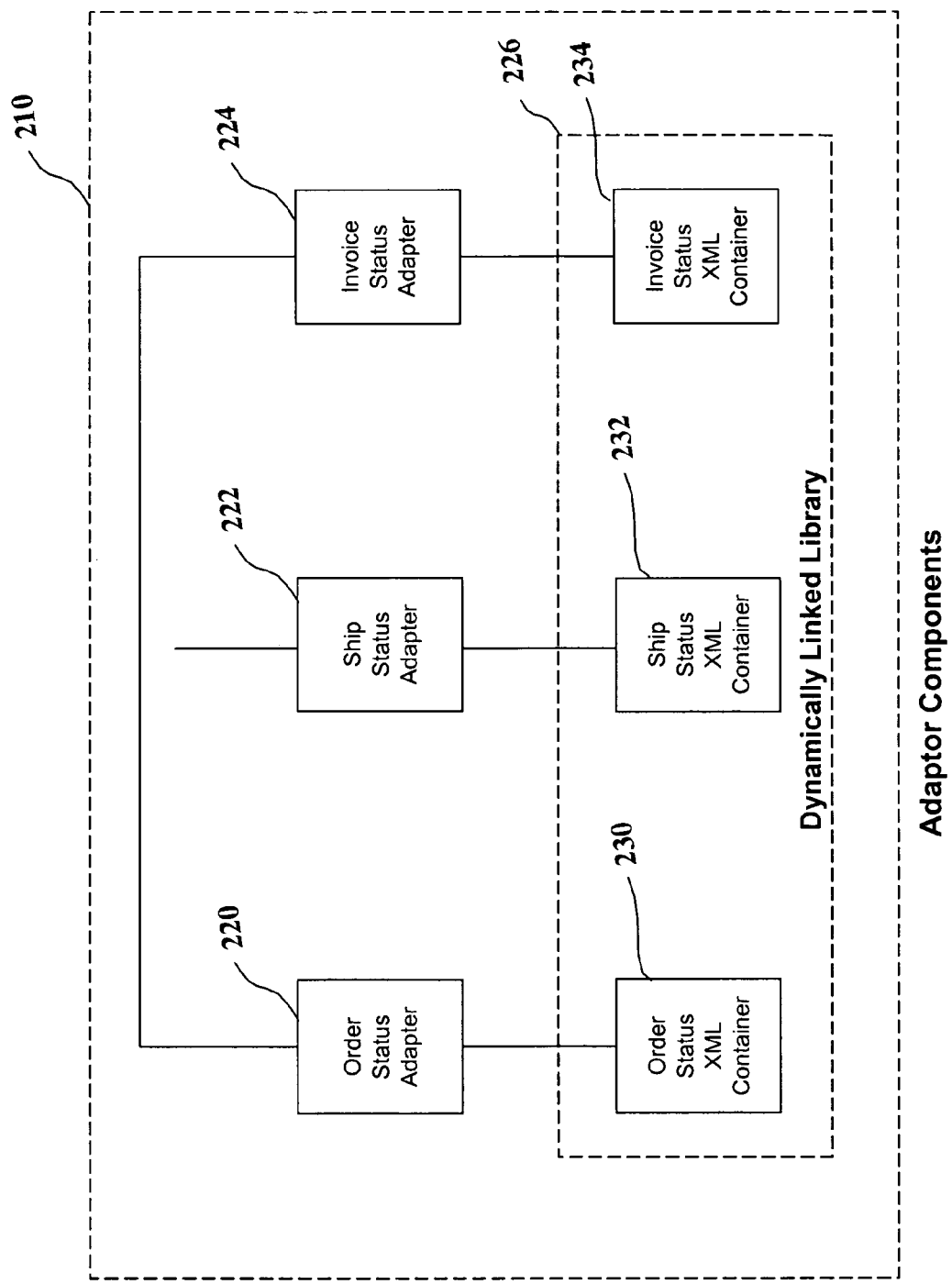
FIG. 2C shows an illustration of additional detail of the modules within the application server of FIGS. 1 and 2A.

Adapter components 210 enable preprocessing of the XML message, invoke a proxy component and define a specific remote procedure call and parameter list. Referring to FIG. 2C which shows additional detail of the modules within memory 124, an example of the function of adapter components 210 is defined. The XML document is passed by SQL adapter 216 in the form of an XML document object model (DOM) object to either order status adapter 220, ship status adapter 222 or invoice status adapter 224. The applicable status adapter then accesses XML container dynamically linked library (DLL) 226 in order to convert the XML DOM object into an XML container object. XML container DLL 226 comprises components that parse the incoming XML document and populates the properties of the document. Thus, the message from order status adapter 220, ship status adapter 222 or invoice status adapter 224 is passed to order status XML container 230, ship status XML container 232 or invoice status XML container 234 respectively and an XML container object is returned. Order status adapter 220, ship status adapter 222 or invoice status adapter 224 then pass a pre-built SQL statement to order status adapter 220, ship status adapter 222 or invoice status adapter 224 respectively. The SQL statement is then passed to back-office database server computer 140 by a SOAP call through rope proxy 212.

SPA object 240 receives any documents which cannot be passed to back-office database server computer 140 by a SOAP call through rope proxy 212. Thus, transmissions which fail due to Internet timeouts, database timeout and other reasons are collected into MSMQ SPA 242, and the system attempts to re-transmit the document in an asynchronous manner.

Referring now to FIG. 3, software modules within memory 144 of back-office database server computer 140 are illustrated. The incoming SOAP call is received by IIS 302. IIS 302 provides for communication between back-office database server computer 140 and application server computer 120. The incoming SOAP call is passed to integration component 306 and then to DBQuery object 310 which processes the SOAP call and accesses the appropriate database to retrieve the requested information or perform the requested manipulation.

As shown in FIG. 1, database memory 164, which represents the business entity's ERP database, is located within intranet 160, which in this embodiment is located on a separate device from back-office database server computer 140. Those of skill in the art will recognize, however, that in accordance with the disclosures herein, the exact location of the databases to be accessed is not significant. The salient features are that the databases are accessible by back-office database server computer 140, and located remote from application server 120. Once the information is retrieved or the manipulation effected, integration component 306 creates a return XML document with the appropriate information. The return XML document follows a reverse transmission path from the request XML document, such that the data from ERP database 164 is ultimately displayed to the user.

User Interface

In operation, a customer of the business entity wishing to determine the status of an order, submits a request for retrieval of a network document by using its computer to establish an Internet connection. The customer enters the appropriate identifying information, such as user name and password, and requests information concerning, for this example, the production status of the order. The service provider's server, utilizing SOAP, formulates an SQL and passes it to business entity's server over the Internet. The business entity's server acts upon the SQL and accesses the ERP software to retrieve the status of the order as it is stored within the ERP software.

Since the data is retrieved from the business entity's ERP databases, it is possible to allow customers to access information concerning order status as it is entered into the ERP database. Alternatively, a company may limit the information available to its customers. This may be done on an account by account basis, or even a person by person basis, to protect the business entity's confidential information while still being responsive to the customer's need for information. As the present invention may also be used to place orders, the flexibility in creating varying degrees of authorized customer access may be used to establish varying degrees of purchasing activities or authority amongst the customers and even amongst the employees of a particular customer. Thus, one individual may be allowed to place orders up to a $1,000 limit, while another may be authorized unlimited purchase amounts. Similarly, the business entity's system may, on a customer by customer basis, accept a range of purchasing transactions. Thus, one customer may be allowed to place an order with terms different from another customer's terms. An established customer may be extended a line of credit, while a new customer transaction may be conducted on a cash basis. These and other variations being within the scope of the present invention.

The above request for retrieval of a network document may be in the form of a Uniform Resource Locator ("URL") which specifically identifies the file to be retrieved and the server where the file resides. Therefore, in accordance with one embodiment of the present invention, a unique URL identifier is used in order to uniquely identify the homepage for the business entity's Web site, which may be in the form "organization.type," these two URL segments serving as unique identifiers for the organization. The specific convention used to uniquely identify the business entity, however, is not critical to the present invention, rather, the salient element is that a business entity is uniquely identified.

A Web site according to the present invention may be created in accordance with methods typically used for creating Web sites. In general, creating a Web site means creating a home page and a multitude of other pages. These pages within the Web site are hypertextually linked.

The business entity home page comprises a means for accessing quasi-public pages. A quasi-public page is a page to which access is limited according to means well known in the art. In one embodiment, a code must be entered in order to access the quasi-public page. Other means for limiting access may include entry of a plurality of codes, entry of username and code, or activation of a button. Of course, those of skill in the art will understand that the means for accessing quasi-public pages need not be imbedded into the homepage. In some applications, it may be desired to locate the means for accessing quasi-public pages on other pages within the Web site. This and other obvious variations being within the scope of the present invention.

In one embodiment, a code is entered into the business entity homepage in order to access non-public on-line resources. The resources are non-public in that they are accessible from a quasi-public page as opposed to a completely public page. In accordance with the present invention, some of the applications stored within application software 204 may be non-public resources as will be discussed below. Because the user is uniquely identified when a non-public resource is accessed, the particular resources which are presented to the user may be uniquely established on a user by user basis according to means well known in the art. Thus, the business homepage functions as a portal to resources on application server computer 120. While in some embodiments the resources to be accessed may be on the same server as the business entity Web site, they may also be located on another server used or owned by the organization or even on a remote server.

According to one embodiment, the data requested is presented to the customer by a navigational interface. One such interface is disclosed in International Application No.: PCT/US99/24859, filed Oct. 22, 1999 by Made2Manage Systems, Inc., based upon U.S. application Ser. No. 09/237, 631 for a NAVIGATIONAL INTERFACE FOR ERP SYSTEM, assigned to Made2Manage Systems, Inc., the contents of which are hereby incorporated by reference. According to this embodiment, information is provided to a user in an intuitive progression. This embodiment uses an hierarchical display of business documents based upon a dominant-subordinate relationship between the documents, the relationship between the documents being established according to a progression based on how documents are encountered in a typical business environment. Accordingly, a user may quickly and easily navigate to the information which is desired.

According to one embodiment, a document collaboration capability is provided. A customer or potential customer may use this application to provide technical detail of unique design specifications. The manufacturer may use this technical detail to provide accurate pricing and availability information. The application may also be used by the manufacturer to provide suggested modifications which could, for example, improve efficiency, reduce cost, or improve reliability of the product. Thus providing a virtual design conference between the manufacturer and the customer. This embodiment is particularly useful in fostering good customer relationships by eliminating miscommunications which lead to erroneous pricing and improperly manufactured products.

Referring initially to FIG. 1, the operation of one embodiment of the present invention from a user perspective is described. In operation, a customer working from customer computer 100 executes a browser program, stored in memory 104 to request, retrieve, and display network documents such as Web pages. Each request by customer computer 100 for retrieval of a network document is formulated in accordance with the network protocol (e.g., HTTP) and transmitted across network 130 to application server computer 120. Application server computer 120 receives the request and processes it using server software program 202 stored in memory 124. Server software program 202 of application server computer 120 then instructs CPU 122 to retrieve the requested page from data stored in memory 124 and to transmit a copy of the requested Web page back to client computer 100 for display on monitor 106.

Figure 4A:
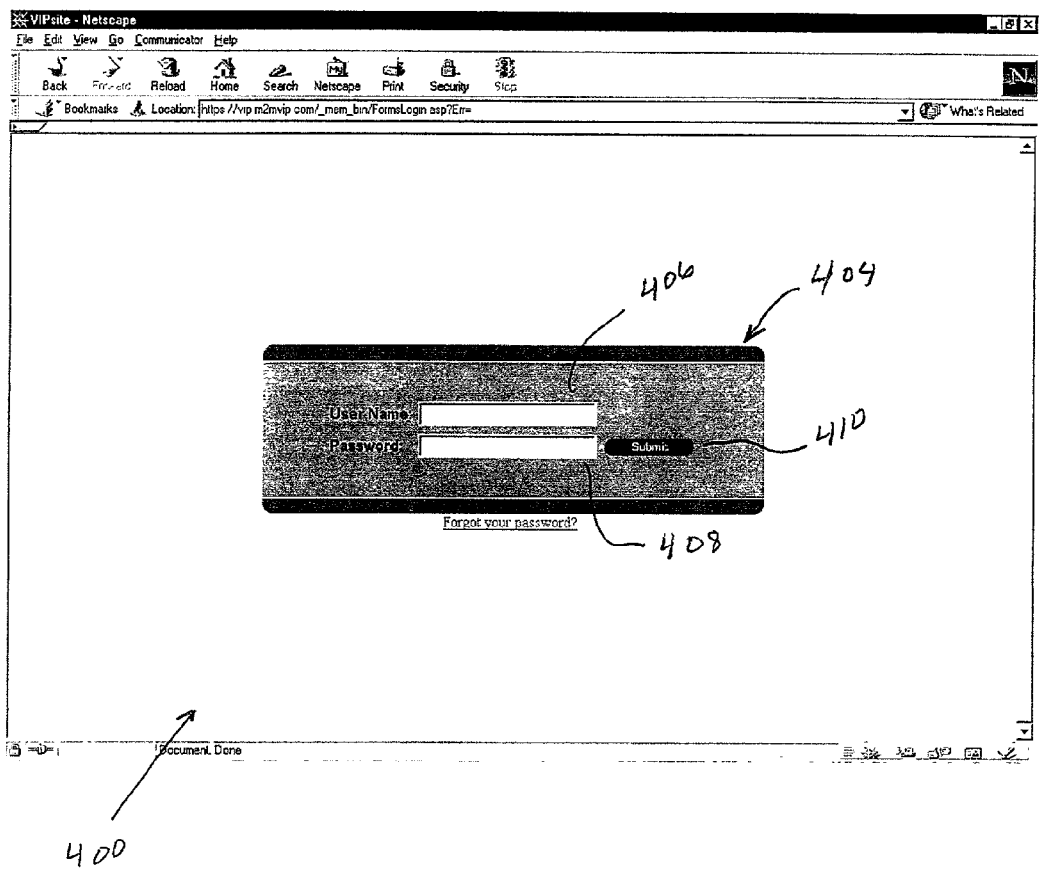
FIG. 4A shows an exemplary Web site home page for a business entity.

Referring to FIG. 4A, exemplary Web site home page is generally indicated by arrow 400. Web site home page 400 may allow established customers access to non-public resources and to allow new customers access to certain quasi-public pages. Access may be controlled by using a generic password such as, for example, "Temporary Password." In this fashion, a new customer may access a limited set of applications from the quasi-public pages. This may be useful when a new customer desires a quote on an item, but has no established relationship with the business entity. These quasi-public pages may be accessed from Web site home page 400 by entering the proper code(s) into code entry box 404. Alternatively, an established customer may have a unique code. Code entry box 404 thus functions as a means to access non-public resources as well as functioning as a means for allowing quasi-public access since code entry box 404 may receive either type of code. Typically, code entry box 404 is presented having username entry box 406 and password box 408. This and other variations are within the scope of the present invention. Once the appropriate code is entered, the customer selects, in this embodiment, submit button 410.

Figure 4B:
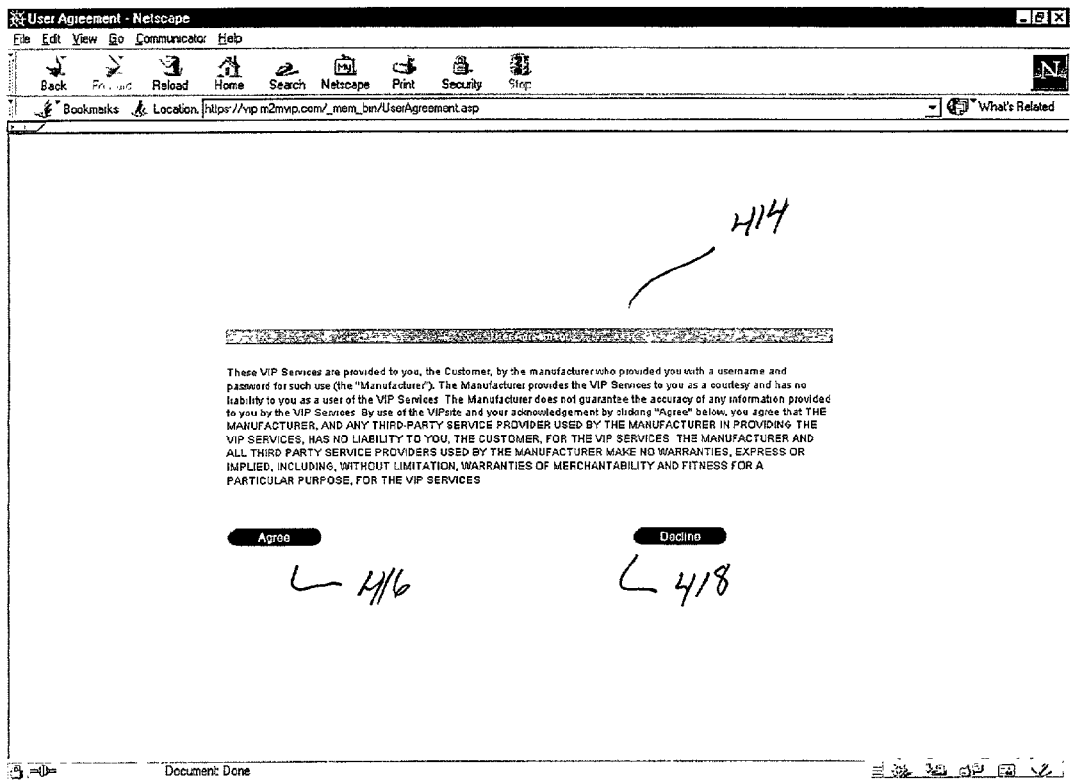
FIG. 4B shows an exemplary User Agreement page for a customer of a business.

When a customer enters the appropriate code and submits the code, a user agreement page may be presented. FIG. 4B shows exemplary User Agreement page 412. After reading terms 414, the customer may accept the terms by selecting agree button 416 to proceed into the Web site. alternatively, the customer may exit the Web site by selecting decline button 418.

Figure 5A:
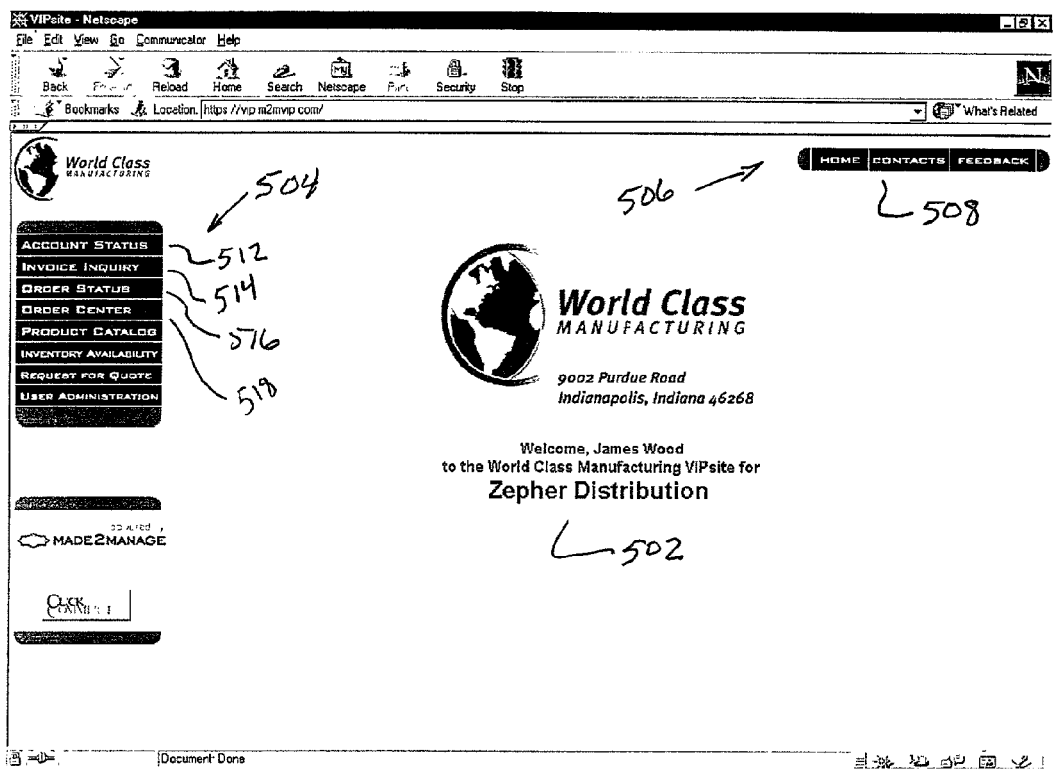
FIG. 5A shows an exemplary welcome page for a customer of a business entity which may be accessed through the exemplary Web site home page of FIG. 4A.
Figure 5B:
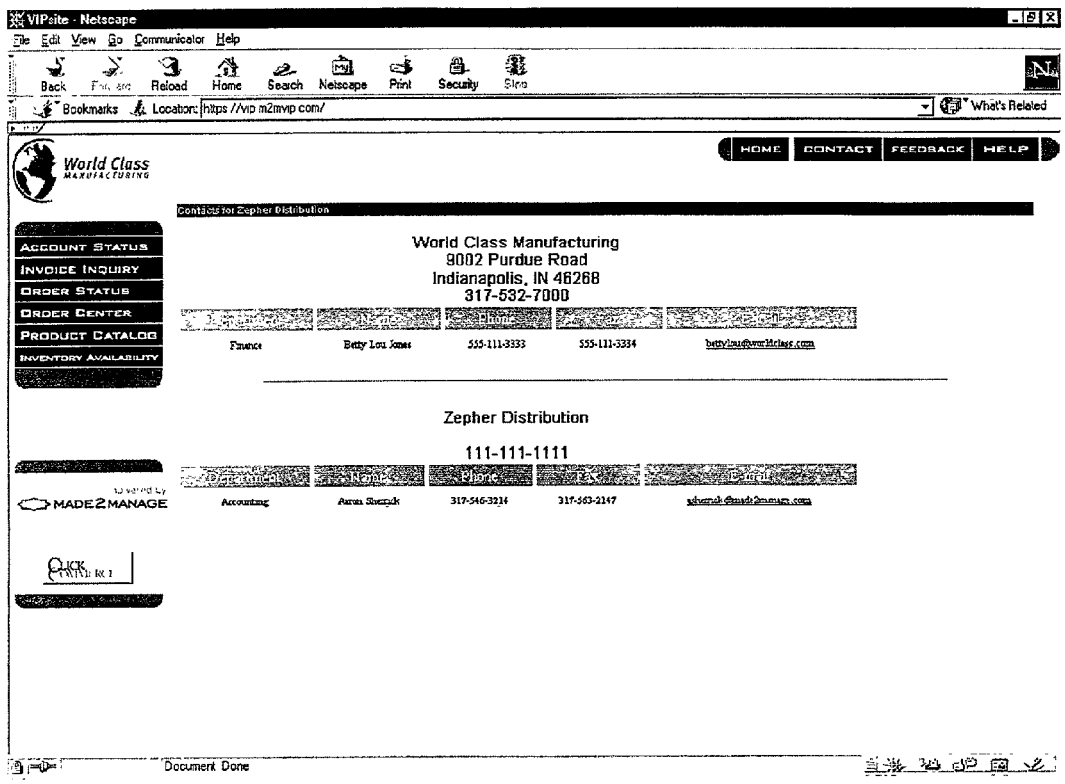
FIG. 5B shows an exemplary contact page which may be accessed through the welcome page of FIG. 5A.

Referring to FIG. 5A, there is shown welcome page 500 which may be accessed through the exemplary Web site home page of FIG. 4A. The particular page presented to a user may be linked to the code entered. The business entity's logo and identifying information is shown in welcome box 502. Resource access buttons 504 represent various resources available to the user. If welcome page 500 is a quasi-public page, then the resources would be quasi-public resources. If welcome page 500 is a non-public page, then resources accessible through welcome page 500 may be a combination of quasi-public and non-public resources. Also shown are general information buttons 506. These buttons may be used to provide access to general information and help on using the Web site. For example, selection of contact button 508 allows the user to navigate to contact page 510 shown in FIG. 5B.

FIGS. 6A through 8F illustrate a variety of Web pages which may be accessed from welcome page 500. A customer may use these Web pages to navigate to information which may be retrieved from a business entity's ERP databases in accordance with the present invention. International Application No.: PCT/US99/24859 discusses the use of a navigational interface through information stored in an ERP system, primarily from the perspective of various user's within a business entity. In accordance with the present invention, navigation is provided to customers of the business entity through that same information stored in an ERP system. Consequently, the interface disclosed in FIGS. 6A through 8F, while a different embodiment, is a functional equivalent of Applicant's International Application No.: PCT/US99/24859, which provides a detailed description of a system and process of navigating through an ERP database.

Figure 6A:
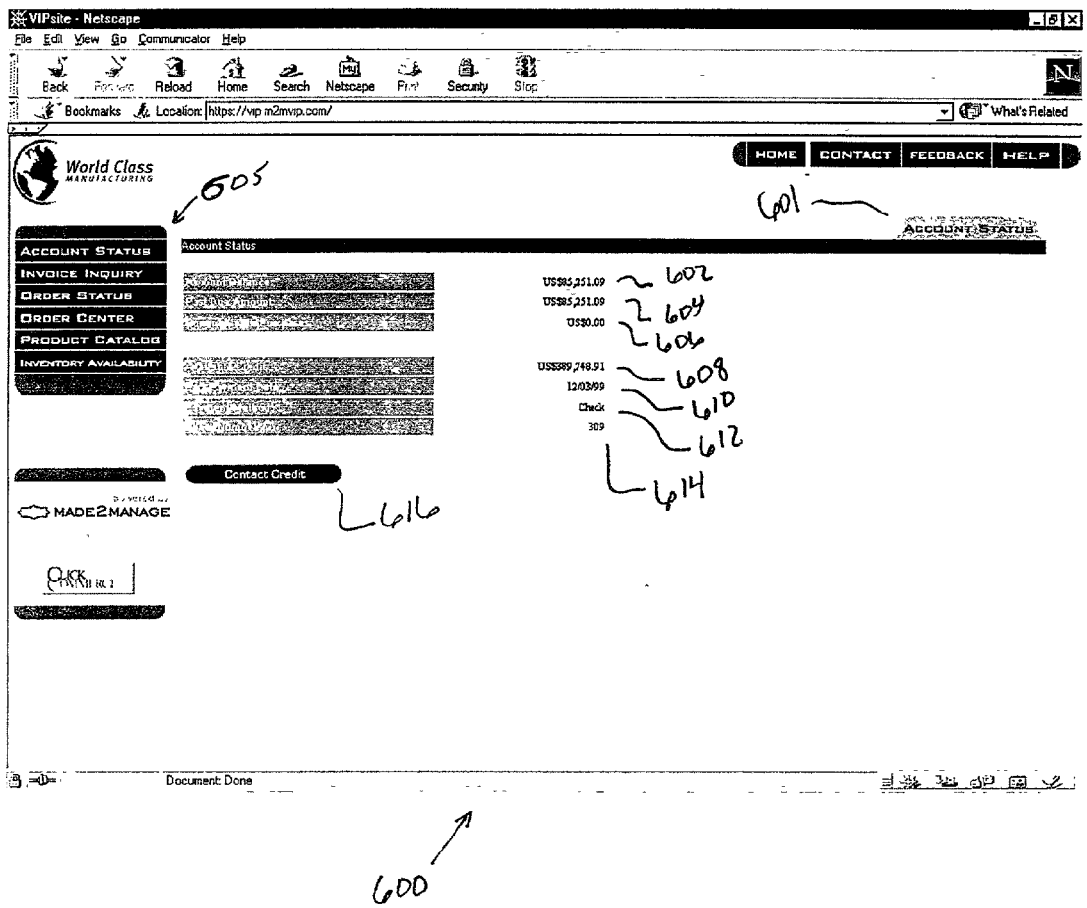
FIG. 6A shows an exemplary account status page for a customer of a business entity which may be accessed through the exemplary welcome page of FIG. 5A.

Selection of account status access button 512, shown on FIG. 5A, allows a user to navigate to account status page 600 shown in FIG. 6A. Navigation to account status page 600, according to this embodiment, is a request from the customer for information available through the business' back-office database server. In response to this request, the invention returns account status page 600 which is populated with data requested by the user. In this embodiment, the location of the user within the Web site is indicated for the convenience of the user by tab 601. In this example, account status page 600 comprises account balance line 602, past due amount line 604, current month purchase line 606, available credit line 608, last payment date 610, payment method 612 and check number line 614. These data are merely representative of the types of information which may be transmitted to the user. Within the scope of the present invention, a multitude of variations exists including, but not limited to, data related to different types of payment methods such as credit cards, electronic transfers, etc., rebate information, returned inventory information and others. The specific data being a function of the desires of the business. Also shown in FIG. 6A, is contact credit button 616. Selection of contact credit button 616 allows a user to navigate to contact credit page 620 shown in FIG. 6B, which is used to provide the user with a specific individual to contact if the user has questions as to the account.

Figure 6B:
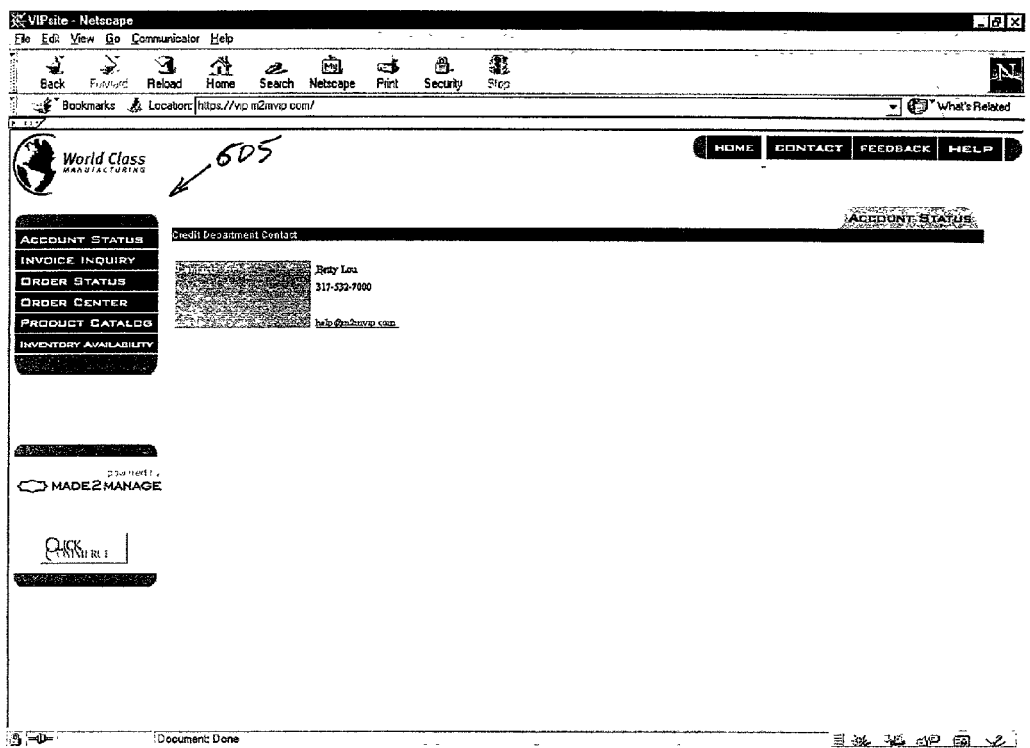
FIG. 6B shows an contact credit page which may be accessed through the account status page of FIG. 6A.

Resource access buttons 605 are shown in both FIG. 6A and FIG. 6B. Thus, a user may navigate to the pages related to these buttons without the need to return to welcome page 500. Depending on the specific application, it may be desired, however, to guide a user back to a central page. Alternatively, different sets of pages may be accessible depending upon the page being viewed. An example of this is shown by comparing FIGS. 6A and 6B with FIG. 5A, wherein resource access buttons 605 are different, from Resource access buttons 504 shown in FIG. 5A. These and other variations being within the scope of the present invention.

Figure 7A:
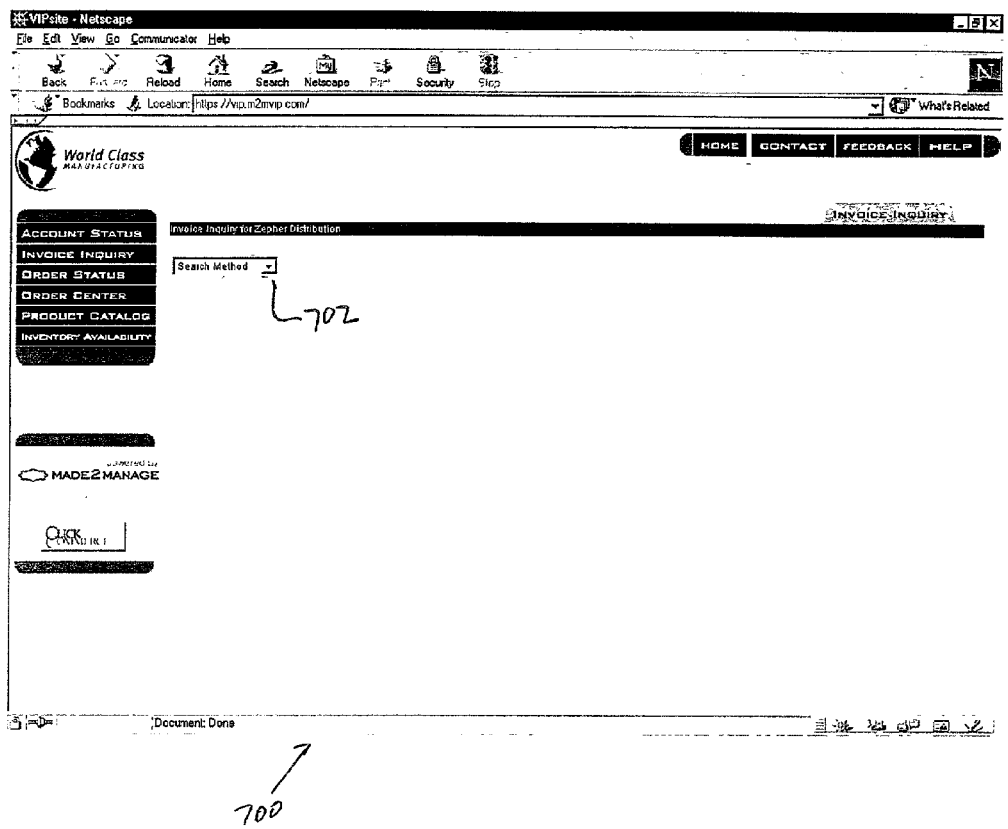
FIG. 7A shows an exemplary invoice inquiry page for a customer of a business entity which may be accessed through the exemplary welcome page of FIG. 5A.
Figure 7B:
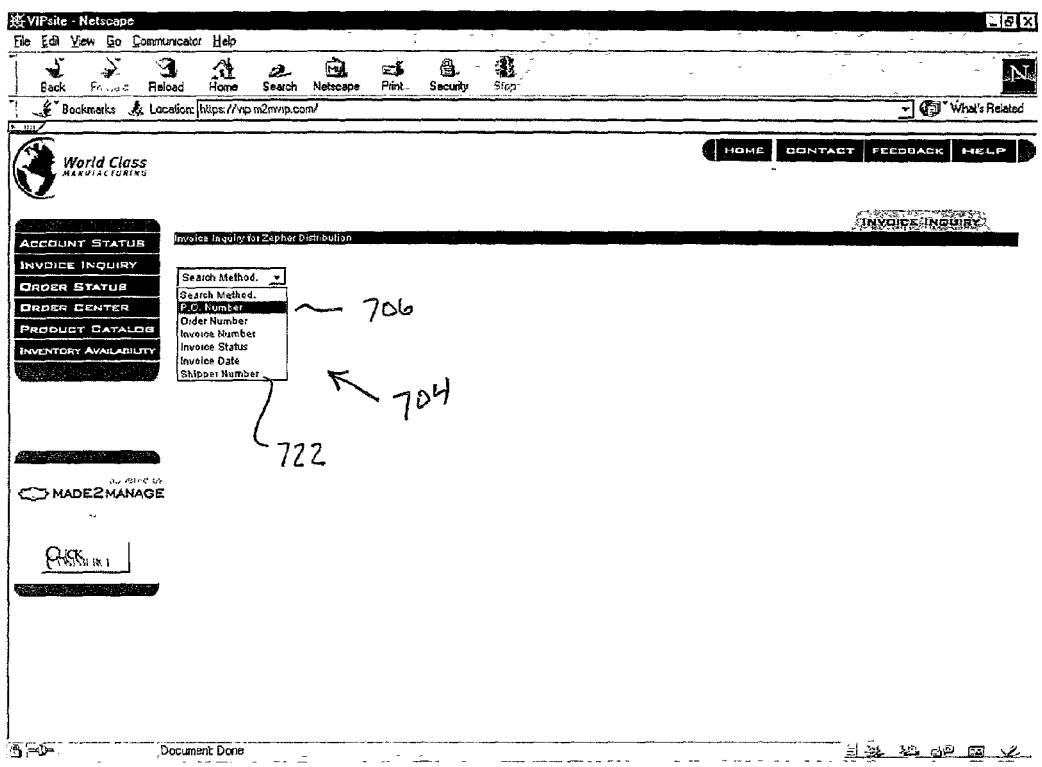
FIG. 7B shows the exemplary invoice inquiry page of FIG. 7A with a drop down menu selected.
Figure 7C:
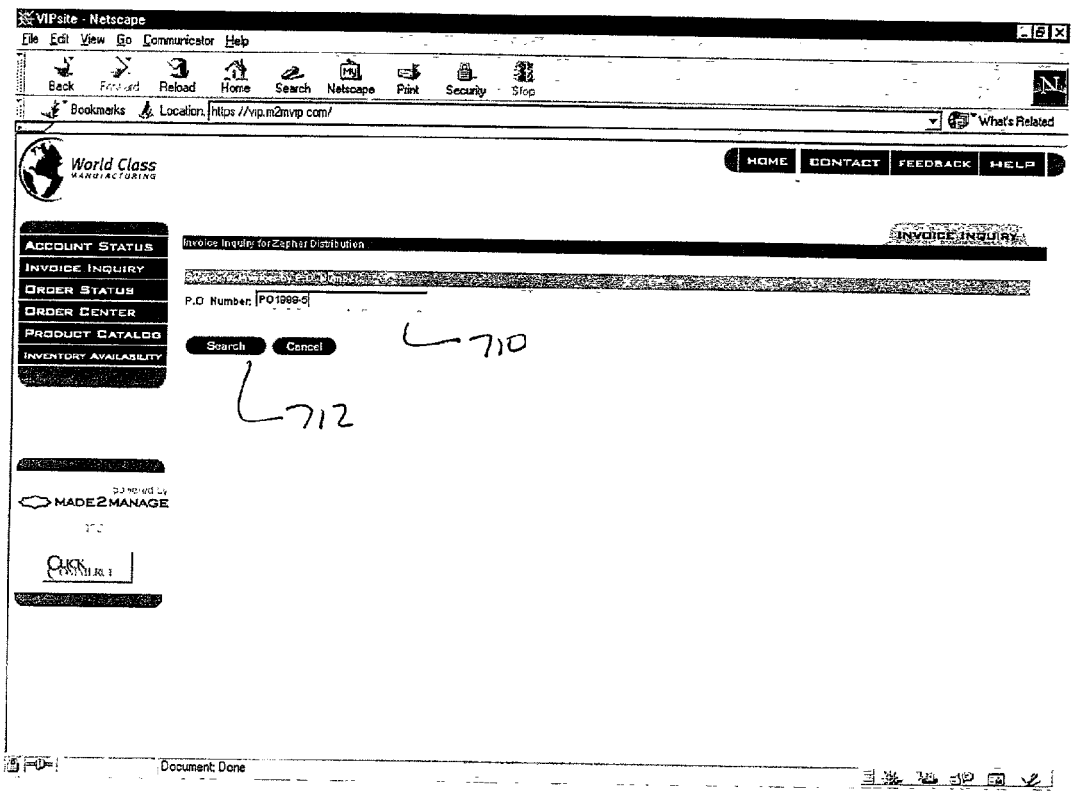
FIG. 7C shows an exemplary P.O Number search page which may be accessed through the drop down menu of FIG. 7B.
Figure 7D:
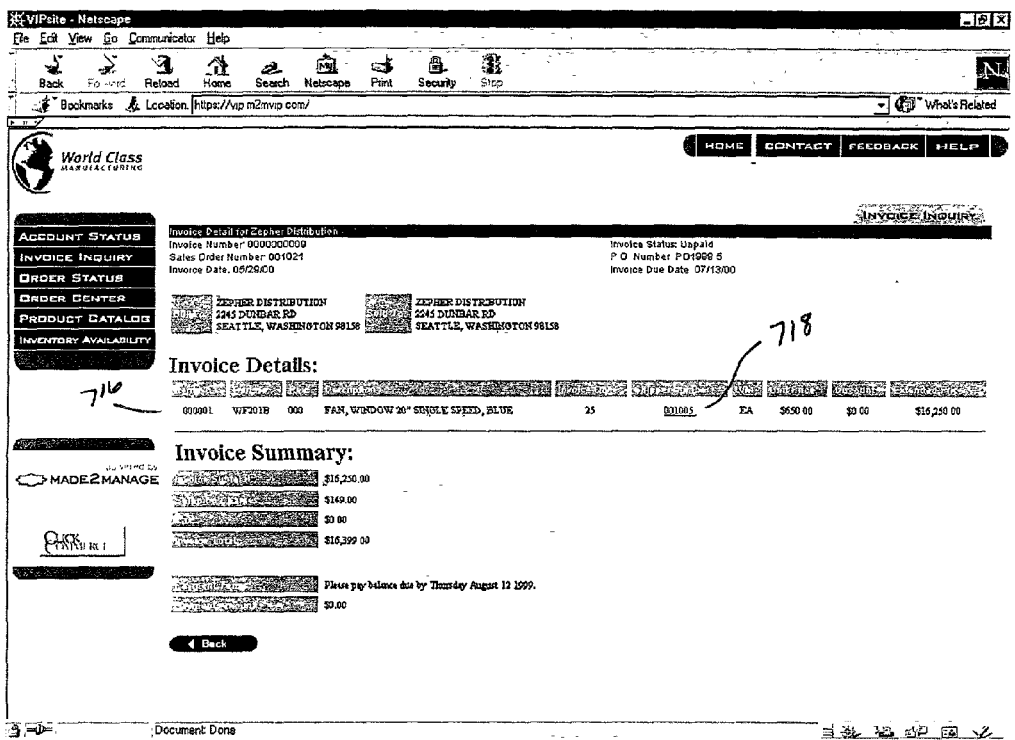
FIG. 7D shows an exemplary invoice data page which is displayed by the system in response to a search using the P.O Number search page of FIG. 7C.
Figure 7E:
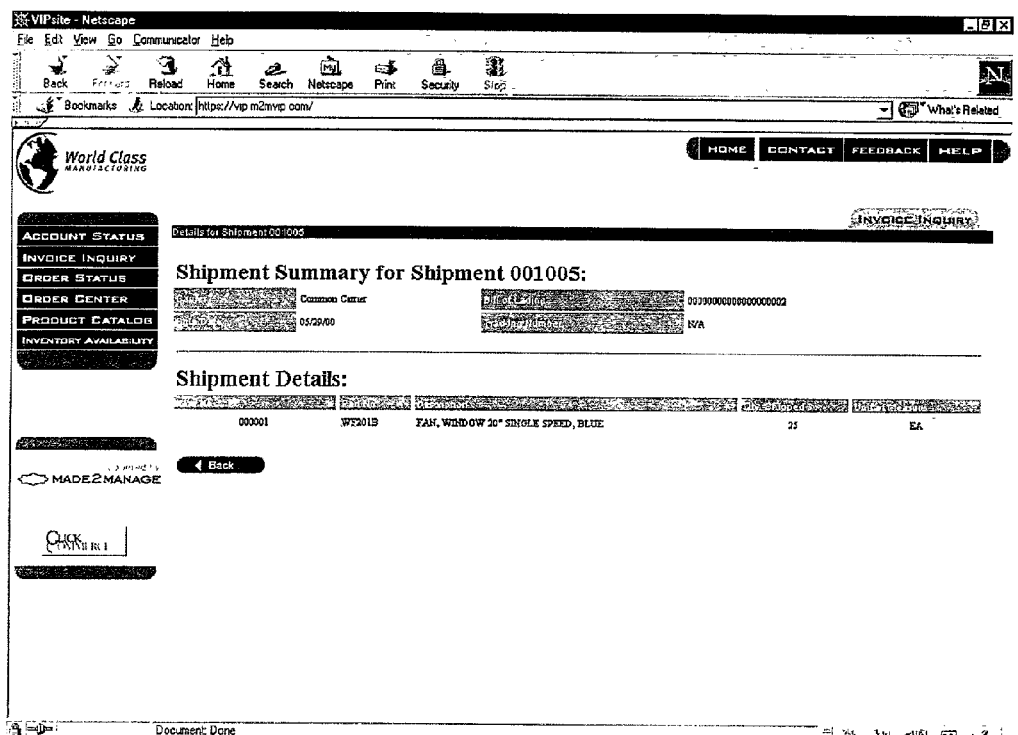
FIG. 7E shows an exemplary shipper page which is accessed from the invoice data page of FIG. 7D.

Returning to FIG. 5A, selection of invoice inquiry button 514 allows a user to navigate to invoice inquiry page 700 shown in FIG. 7A. Selection of drop down menu button 702 causes drop down menu 704, shown in FIG. 7B, to be displayed. A user may select any of the displayed options for use in requesting information from a business' ERP database. The specific list of available search options is not salient to present invention, and may be modified depending upon the particular application. Selecting P.O. Number search option 706 causes P.O. Number search page 708 to be displayed.

The user may then enter a particular P.O number into P.O. Number search box 710. Selection of search button 712 causes the system to transmit the request for information to the business' back-office database server. In response to the request for information, the system returns invoice data page 714, shown in FIG. 7D, which is populated with the data associated with the purchase order which was searched. In the example shown in FIG. 7D, the item associated with the invoice, identified in item number box 716, had already been shipped to the customer. Consequently, as indicated by the number in shipper number box 718, a shipper document had been generated. The user may navigate directly to the shipper document by selecting the hypertext link in shipper number box 718. Thus, information associated with the selected shipper number is retrieved from the business and displayed to the user as shipper page 720 shown in FIG. 7E.

Figure 7F:
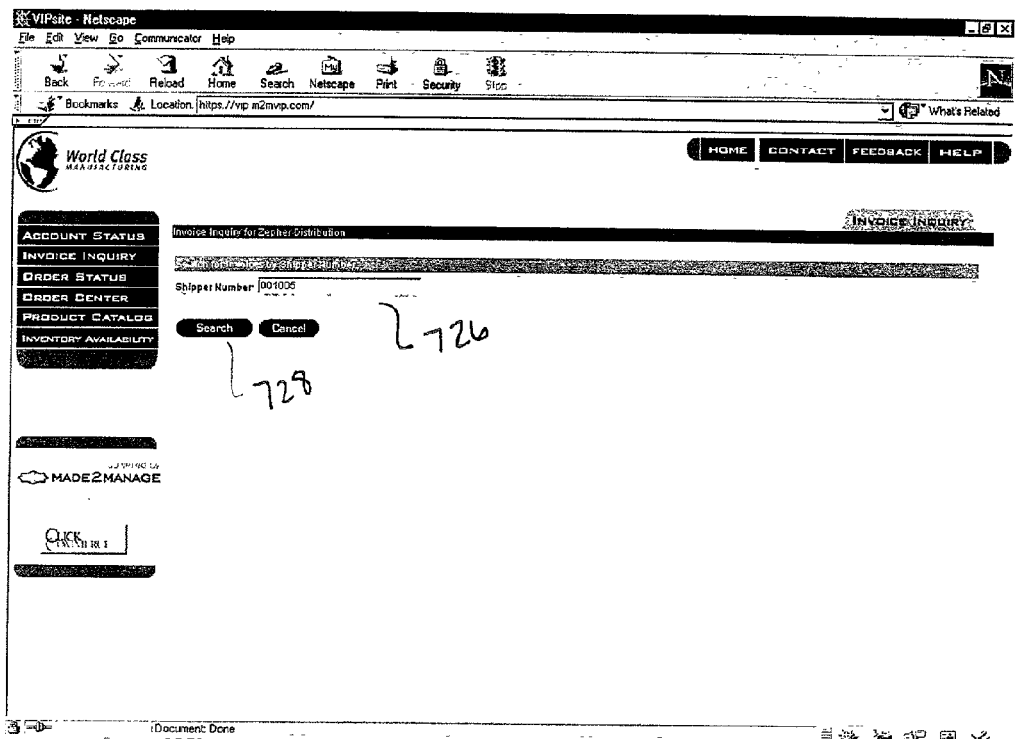
FIG. 7F shows an exemplary shipper search page which may be accessed through the drop down menu of FIG. 7B.
Figure 7G:
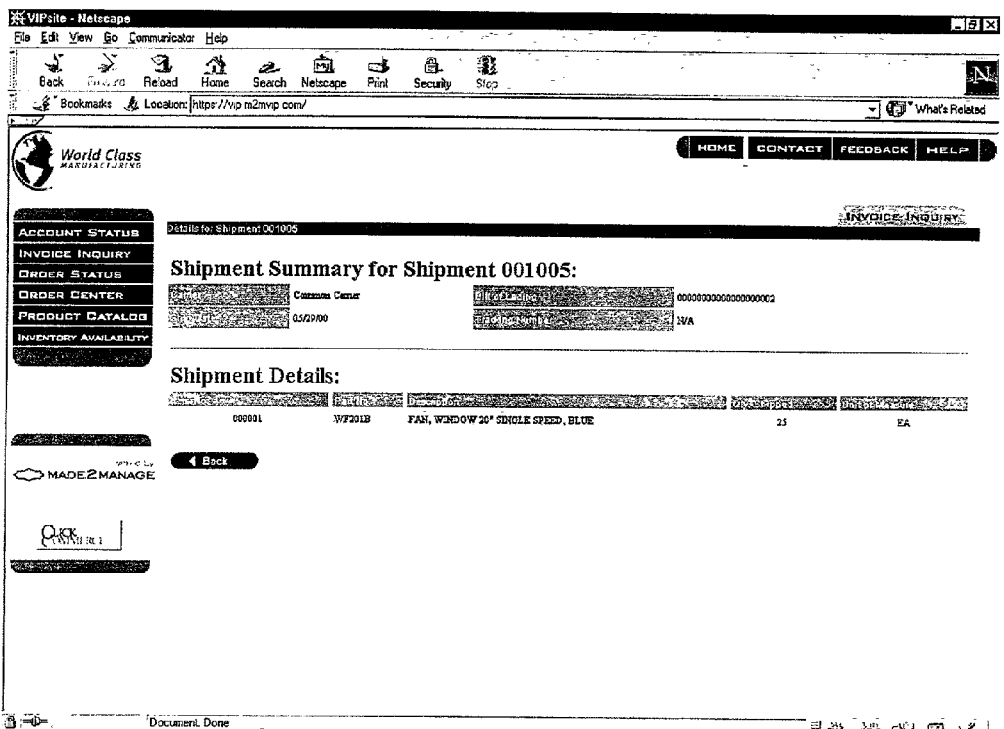
FIG. 7G shows an exemplary shipper page which is displayed by the system in response to a search using the shipper search page of FIG. 7F.

As is explained more fully in International Application No.: PCT/US99/24859, the present invention allows for a number of navigational paths to obtain the same information. By way of example, a user already cognizant of the shipper number of interest, may bypass P.O. Number search page 708 and invoice data page 714, by simply selecting shipper number search 722 of drop down menu 704. In response, the embodiment of FIG. 7B displays shipper search page 724 to the user as shown in FIG. 7F. Entry of the shipper number in shipper number search box 726 and selection of search button 728 causes the system to retrieve data from the business' back-office database server related to the shipper specified. In the example shown in FIG. 7F, the results in shipper page 730 shown in FIG. 7G to be displayed. This is identical to shipper page 720 shown in FIG. 7E.

Figure 8A:
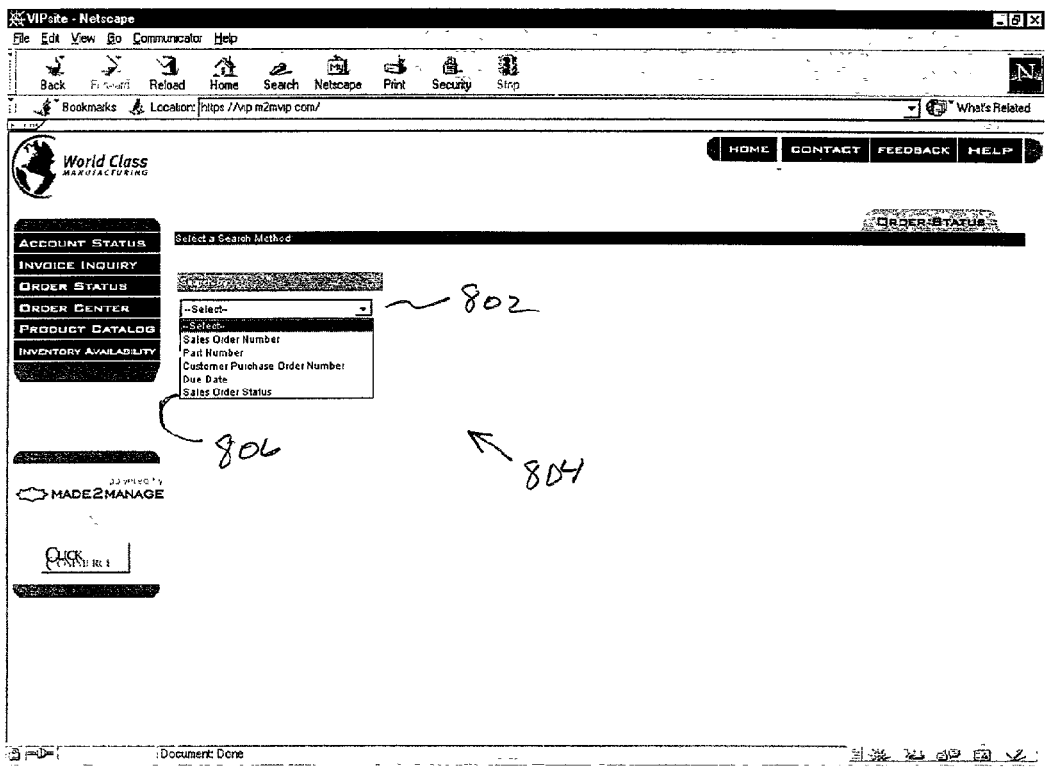
FIG. 8A shows an exemplary invoice order status search page for a customer of a business entity which may be accessed through the exemplary welcome page of FIG. 5A.
Figure 8B:
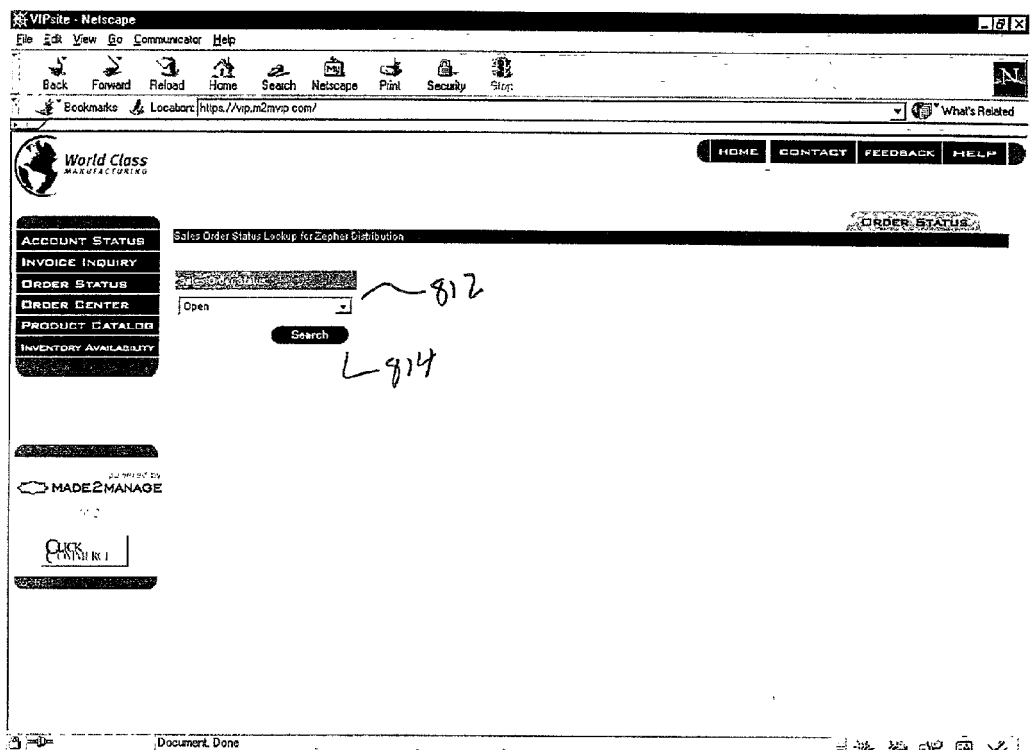
FIG. 8B shows an exemplary sales order status search page which may be accessed through the drop down menu of FIG. 8A.

Similarly, a user may instead select order status button 516 of welcome page 500 shown in FIG. 5A. In response, order status search page 800, shown in FIG. 8A, is displayed. By selecting drop down menu button 802, drop down menu 804 is displayed. A user may search using any of the options displayed. A user interested in the status of open sales orders may, for example, select sales order status search option 806. The system then displays sales order status search page 810, shown in FIG. 8B, which comprises search box 812. By selecting "open" in sales order status search box 812 and selecting search button 814, the business' back-office database server is queried for information.

Figure 8C:
FIG. 8C shows an exemplary search result which is displayed by the system in response to a search using the sales order status search page of FIG. 8B.
Figure 8D:
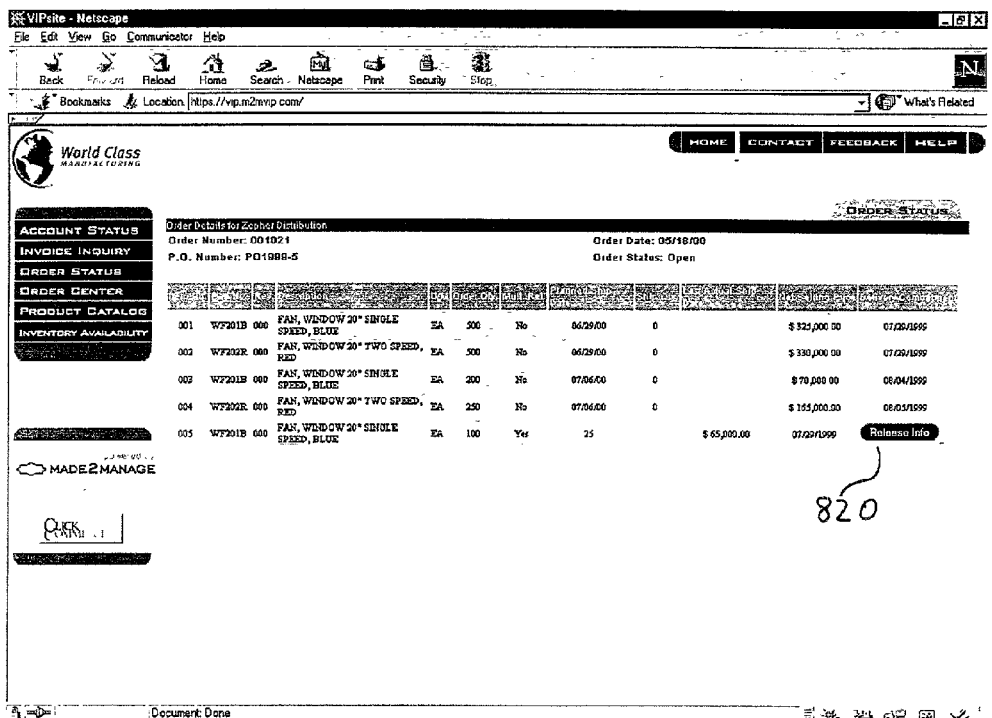
FIG. 8D shows an exemplary order detail page which is accessed from the exemplary search result of FIG. 8C.
Figure 8E:
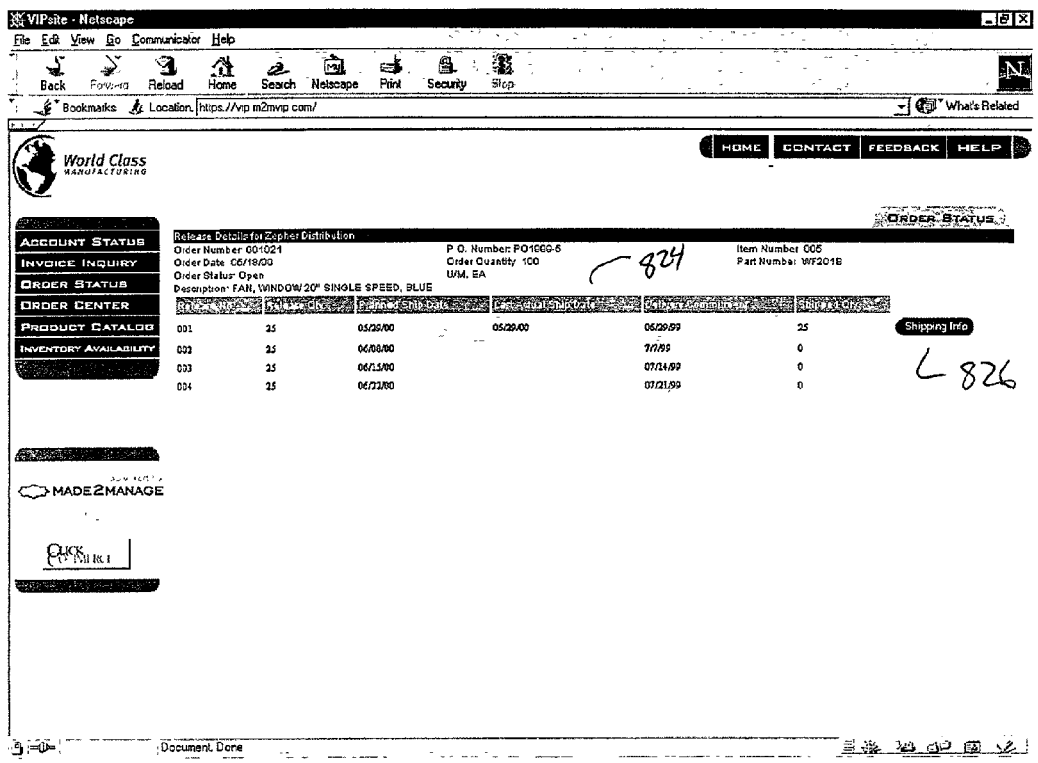
FIG. 8E shows an exemplary release information page which is accessed from is the exemplary order detail page of FIG. 8D.
Figure 8F:
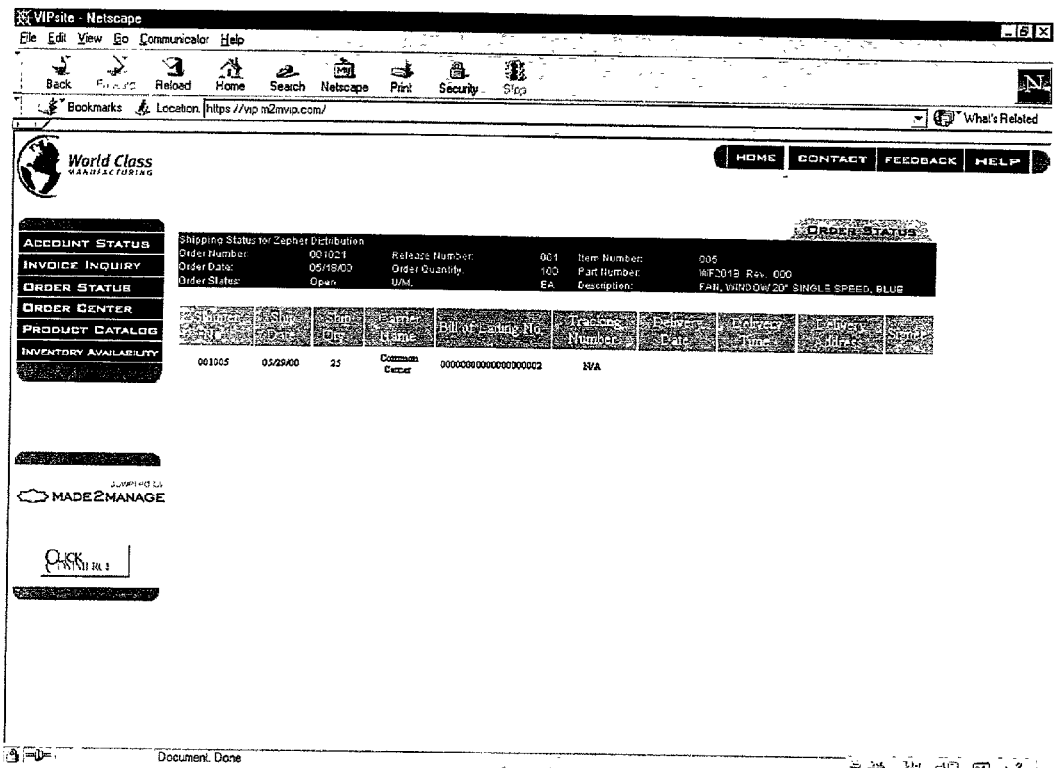
FIG. 8F shows an exemplary shipping status page which is accessed from the release information page of FIG. 8E.

In response, the system returns a list of open sales orders as shown in FIG. 8C. To access additional information, the user selects the "detail" button associated with the sales order of interest. Thus, a user interested in sales order number 001021, may select detail button 816, which causes order detail page 818 of FIG. 8D to be displayed. In this example, item number 005 is a multiple release item as indicated by release information button 820. Therefore, a user desiring details as to the releases associated with item number 5, may select release information button 820. In response, release details page 822 of FIG. 8E is displayed. The user may then verify the release information associated with item number 5. The initial release for this item has already been shipped as indicated by the date in last actual ship date column 824. To inquire as to the details of the shipment, the user selects shipping information button 826. In response, the system will return shipping status page 828 shown in FIG. 8F. The information on shipping status page 828 corresponds to the information shown in shipper page 730 shown in FIG. 7G and shipper page 720 shown in FIG. 7E. In this embodiment, however, shipping status page 828 includes additional information not shown in shipper page 720 or shipper page 720. The actual information displayed and the format of the various pages are not central to the present invention. Rather, the salient element is that information may be navigated to using a variety of paths.

Figure 9A:
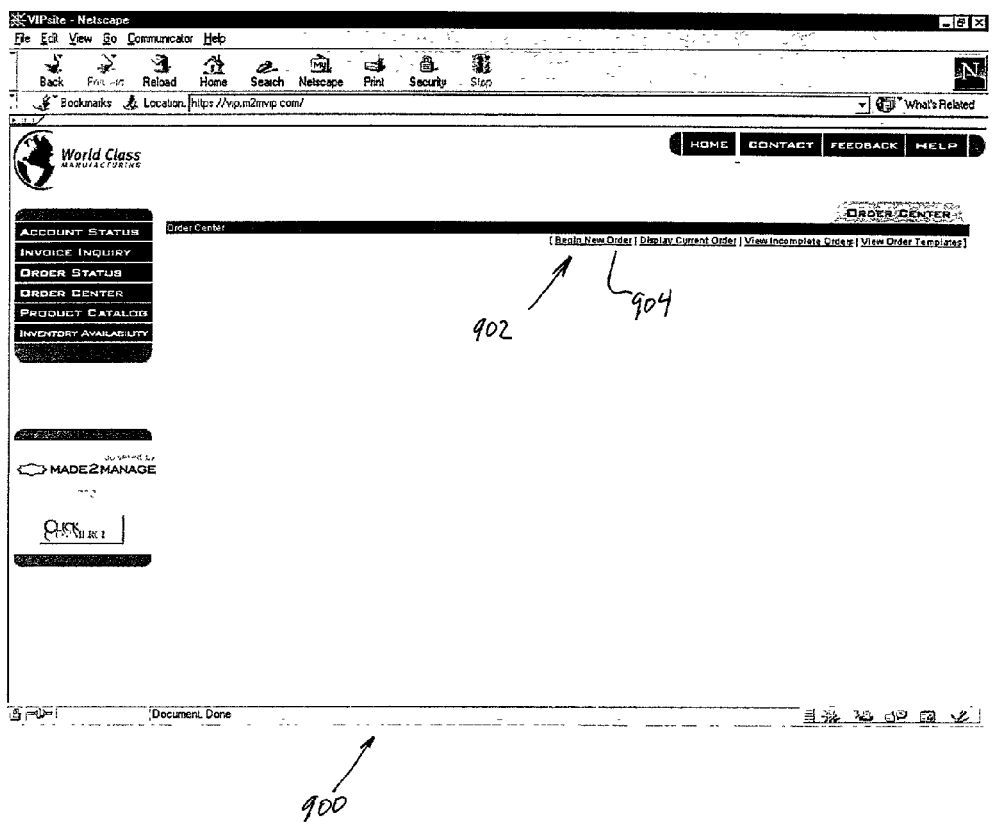
FIG. 9A shows an exemplary order center page for a customer of a business entity which may be accessed through the exemplary welcome page of FIG. 5A.
Figure 9B:
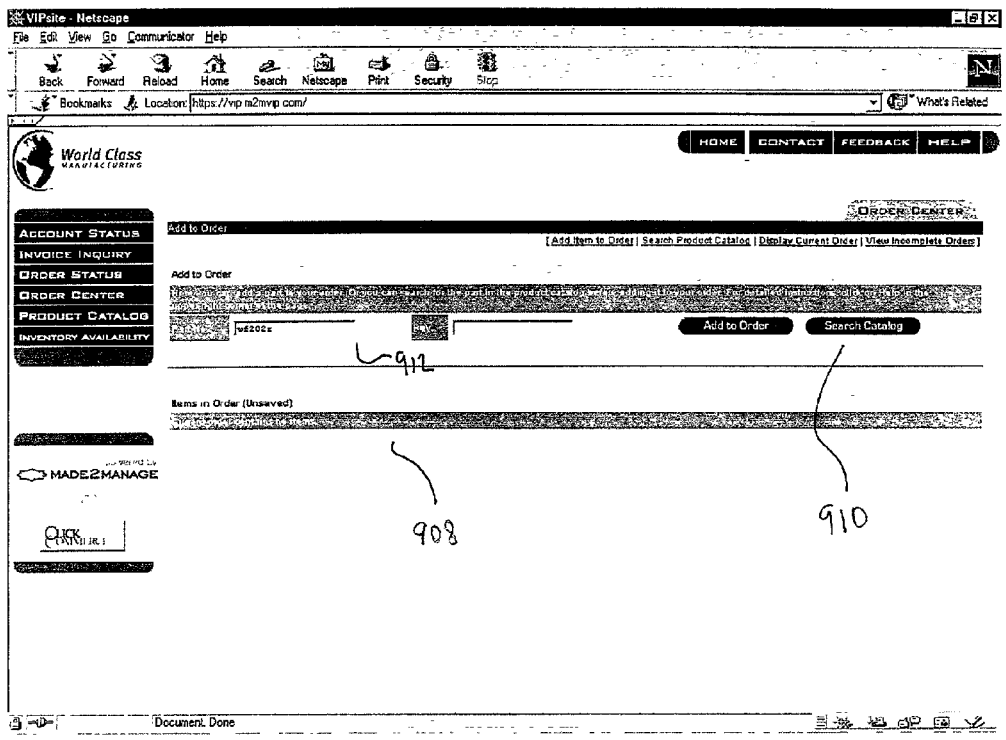
FIG. 9B shows an exemplary add to order page which may be accessed from FIG. 9A.
Figure 9C:
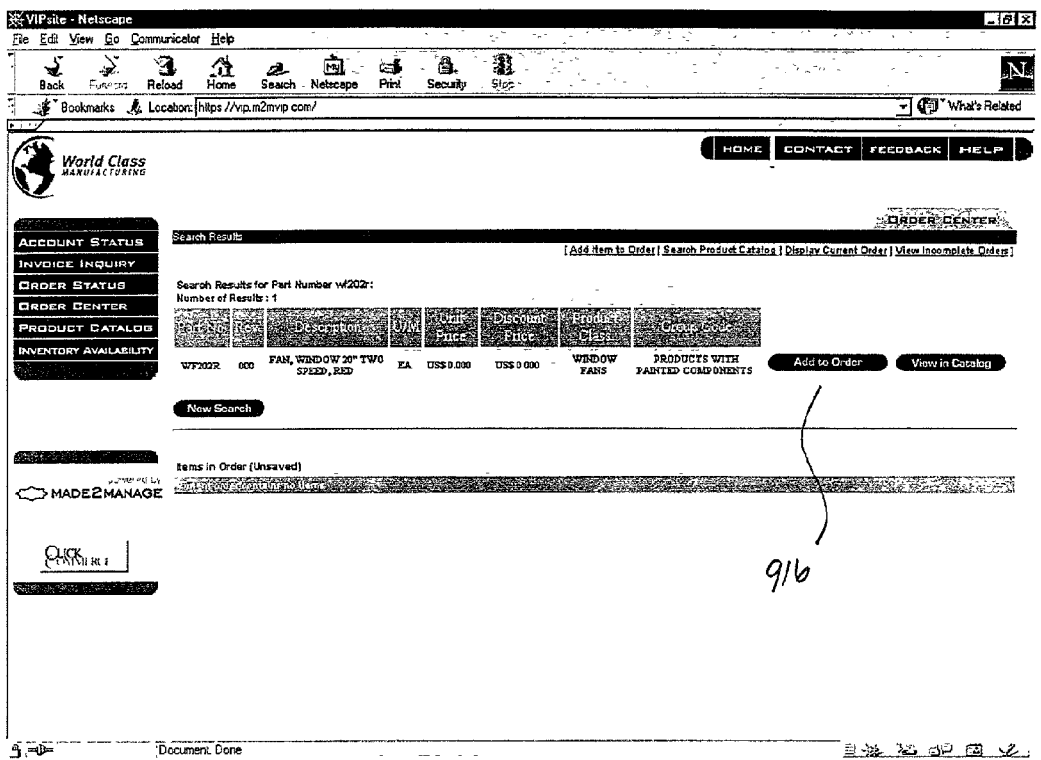
FIG. 9C shows an exemplary search result which is displayed by the system in response to a search using the add to order page of FIG. 9B.
Figure 9D:
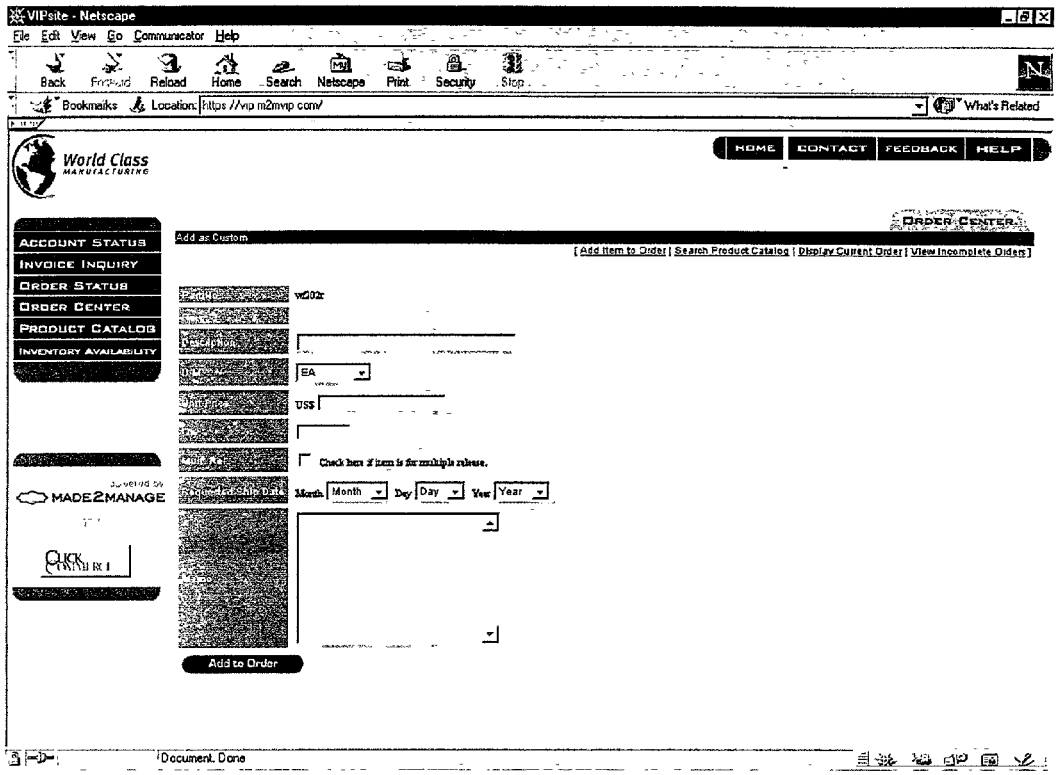
FIG. 9D shows an exemplary add as custom page which is accessed from the exemplary search result of FIG. 9C.
Figure 9E:
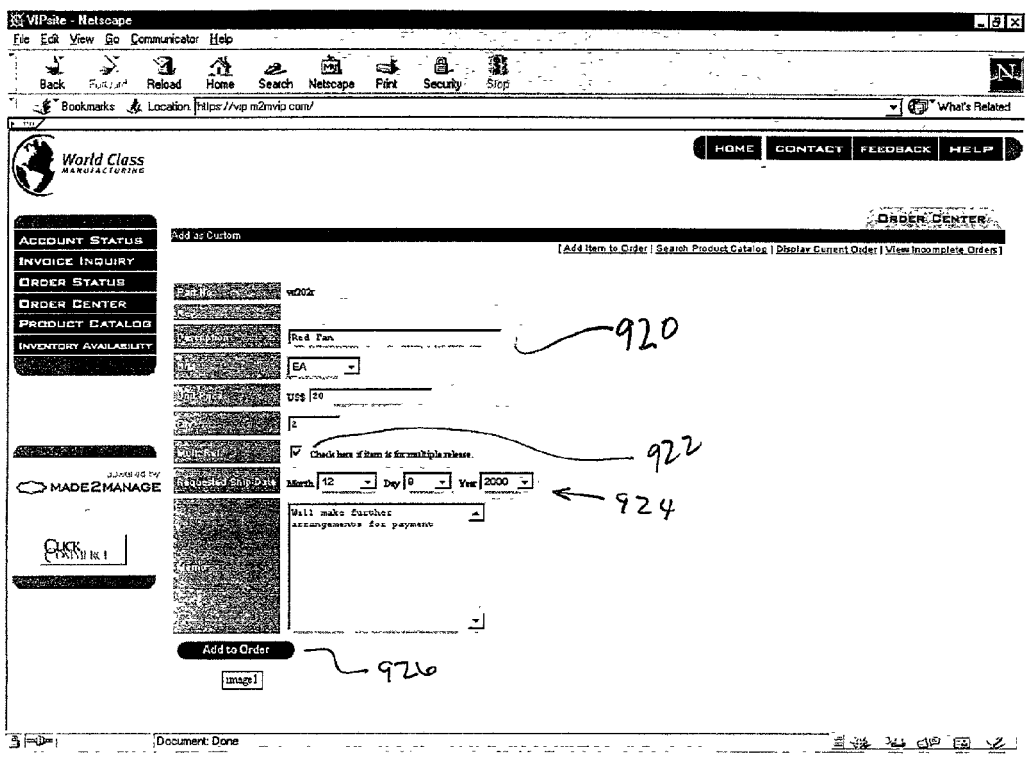
FIG. 9E shows the exemplary add as custom page of FIG. 9D with information added by the user.

The present invention may incorporate a wide variety of functionality depending on the particular needs of the business entity. By way of example, but not of limitation, one example of the functionality is the ability to accept user unique orders from customers of the business entity. Referring initially to FIG. 5A, one such example is discussed. A user may select order center button 518 in order to navigate to order center page 900 shown in FIG. 9A. The user may then navigate to any of order option pages 902. Initially, the user may begin a new order by selecting hypertext link 904. The system responds by displaying add to order page 906 as shown in FIG. 9B. Order page 906 functions as a shopping list for items selected by the user. In the example of FIG. 9B, no items have been selected. This status is reflected in status line 908. If the user wishes to browse the business' catalog, the part number of an item may be entered into part number box 912, and search catalog button 910 may be selected. In response, the system displays search results page 914 shown in FIG. 9C. Search results page 914 is populated with information regarding the item searched. The user may proceed with an order by selecting add to order button 916. Because, in this example, the selected item may be customized according to the particular needs of the customer, the system causes add as custom page 918 to be displayed as shown in FIG. 9D. Accordingly, a customer may insert customized requests into the fields of add as custom page 918. FIG. 9E shows add as custom page 918 of FIG. 9D after a user has input unique needs.

Figure 9F:
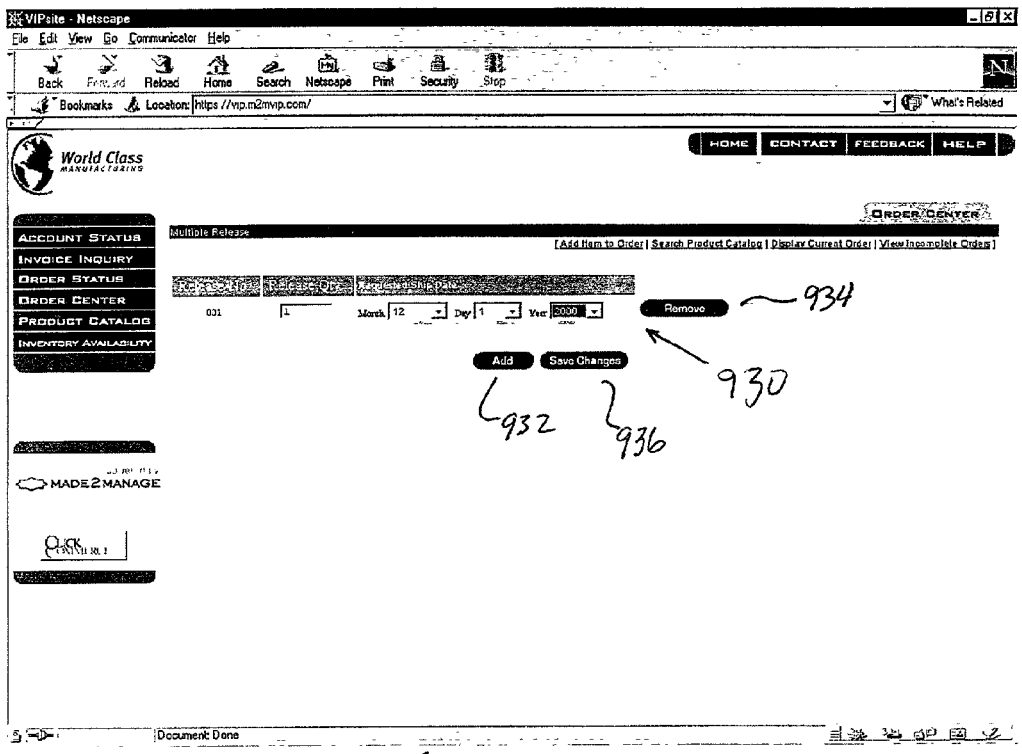
FIG. 9F shows an exemplary multiple release page which is accessed from the add as custom page of FIG. 9E.

As shown in FIG. 9E, the customer has indicated that the desired item should be painted a particular color by typing "red fan" in description field 920. Additionally, the customer desires the items to be delivered over a period of time. Thus, multiple release field 922 has been selected and the requested date of first shipment has been indicated in requested ship date fields 924. Once add as custom page 918 has been completed to the satisfaction of the user, add to order button 926 may be selected. Because the user has requested multiple releases, the system presents multiple release page 928 which may be used to input the quantity of items and the requested release date for the first release as shown in FIG. 9F. Once the requested data is input into first release fields 930, the user may save the information and move to the next release by selecting add button 932. In the event the user makes a mistake in the data or determines that different data is desired, data within the release fields for a particular release may be removed by selecting remove button 934. If all data regarding releases has been input to the user's satisfaction, the user may proceed with the order by selecting save changes button 936. In the event the user selects add button 932, however, the system presents the next release field as shown in FIG. 9G.

Figure 9G:
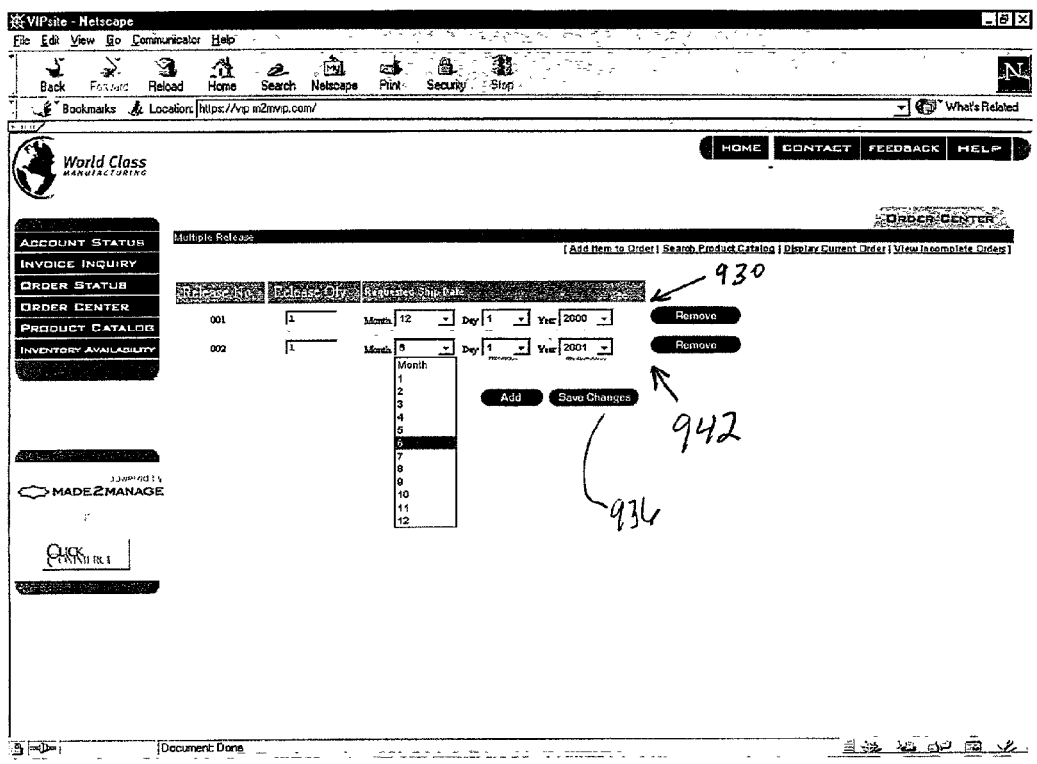
FIG. 9G shows an exemplary multiple release page which displayed when additional releases are indicated by the user selecting the add button of FIG. 9F.
Figure 9H:
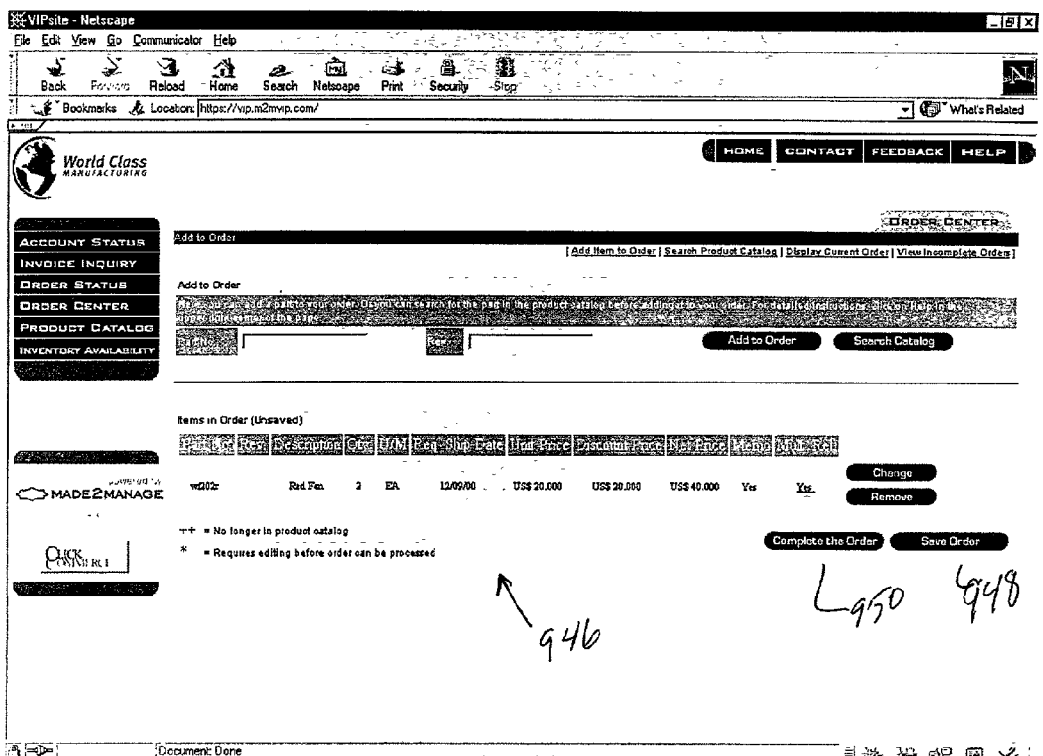
FIG. 9H shows an exemplary add to order page which is displayed when the save changes button of FIG. 9G is selected by the user.

Referring to FIG. 9G, multiple release page 940 displays second release fields 942 in addition to first release fields 930. The user may input data into second release fields 942 in the same manner as described with respect to first release fields 930. As stated above, once all desired data has been input, the user selects save changes button 936. In response, the system presents add to order page 944 of FIG. 9H to the user. Add to order page 944 is identical to add to order page 906 of FIG. 9B with the exception that items in order field 946 comprises the data input by the user as described above. Once all desired items have been identified, the user may select save order button 948 in order to save the information without completing the order, or complete the order by selecting complete the order button 950.

In response to complete the order button 950 being selected, the system presents complete order page 952 to be displayed as shown in FIG. 9I. All items selected by the user are listed in items in order fields 954. Items in order field 954 comprises special messages fields 956 which may be used to communicate specific information to the user concerning the order. Billing and shipping information fields 958 are also displayed so that the information may be verified. FIG. 9I' shows the lower half of complete order page 952 of FIG. 9I which may be viewed by using scroll bar 960. The shipping information may be changed by selecting change order ship to button 962. Alternatively, multiple shipping addresses may be entered by selecting ship to multiple addresses button 964.

Those of skill in the appropriate art will understand that a number of alternative embodiments of the present invention exist. For example, by adding a computer assisted design application to the system, a user may actually design unique items and submit these items to the business for a quote. Furthermore, while the above examples have described a small area of one embodiment of the present invention, those of skill

What is claimed is:

1. A system for passing communications between a manufacturer and a manufacturer's customer, the system comprising:
    a customer interface for passing communications to and from a customer;
    an application server in communication with said customer interface comprising an application level protocol for receiving customer communications from the customer interface and, in response to said customer communication, generating a message;
    a client interface in communication with said application server for passing messages to and from said application server;
    a remote back-office database server coupled to said client interface, the back-office database server providing access to data which is desired by the customer wherein the data is in the form of representations of a plurality of business documents;
    means for relating the plurality of business documents according to a previously established progression, the previously established progression defining the relationships between different types of business documents as they are encountered in a typical business environment and defining allowed navigation paths between the plurality of business documents;
    means for displaying the previously established progression as a hierarchical tree structure of representations of business documents, the tree structure having at least one branch, wherein:
        the tree structure has a plurality of levels in a hierarchy, each level being in a dominant-subordinate relationship with each adjacent level,
        at least two levels in the same branch comprise at least one document type node and at least one document instance node,
        the document type nodes in at least two different levels in the same tree branch identify different types of business documents,
        each document instance node is:
            (a) immediately subordinate to a document type node,
            (b) associated with a representation of the same type of business document as a document instance node in the same level of the same branch, and
            (c) associated with a representation of a business document that is related to a representation of a business document associated with a document instance node in another level in the same branch;
    means for selecting a particular document instance node; and
    means for displaying information contained in the representation of a business document associated with a selected document instance node.

2. The system of claim 1, wherein the back-office database server comprises a means for accessing data used by an enterprise resource planning program.

3. The system of claim 2, wherein the application level protocol comprises a simple object access protocol.

4. The system of claim 3, wherein the messages passed to and from said application server are in the form of extensible markup language documents.

5. A method of exchanging information in a manufacturing environment between a manufacturer and a customer, comprising the steps of:
    providing a back-office server;
    providing representations of a plurality of business documents accessible through the back-office server;
    providing a means for relating the plurality of business documents;
    providing a means for displaying a hierarchical tree structure of representations of business documents, the tree structure having at least one branch, wherein:
        the tree structure has a plurality of levels in a hierarchy, each level being in a dominant-subordinate relationship with each adjacent level,
        at least two levels in the same branch comprise at least one document type node and at least one document instance node,
        the document type nodes in at least two different levels in the same tree branch identify different types of business documents,
        each document instance node is:
            (a) immediately subordinate to a document type node,
            (b) associated with a representation of the same type of business document as a document instance node in the same level of the same branch, and
            (c) associated with a representation of a business document that is related to a representation of a business document associated with a document instance node in another level in the same branch;
    providing a means for selecting a particular document instance node; and
    providing a means for displaying information contained in the representation of a business document associated with a selected document instance node;
    providing an enterprise resource planning program accessible throught the remote back-office database server;
    receiving from a customer a request for information, by
        selecting with the means for selecting a particular document instance node a first of at least two document instance nodes that is in a level dominant the level of a second of the at least two document instance nodes, such that information associated with the first document instance node is displayed with the display means, and
        selecting with the means for selecting a particular document instance node a second of the at least two document instance nodes which is in a level subordinate to the first of at least two document instance nodes, such that information associated with the second document instance node is displayed with the display means;
processing the request for information from the customer;
transmitting the processed request for information to the remote back-office database server;
receiving information from the back-office database server; and
transmitting to the customer the information received.

6. A method of exchanging information in a manufacturing environment between a manufacturer and a customer, comprising the steps of:
  initiating a logical session between a customer and an application server;
  receiving from a customer a request for information;
  processing the request for information from the customer;
  transmitting the processed request for information to a remote back-office database server;
  receiving information from the back-office database server; and
  transmitting to the customer the information received;
  providing access to representations of at least a first and a second business documents of differing types through the back-office database server, said representations being related by a common key;
  displaying, for the representations of the at least first and second business documents, a dominant reference and a subordinate reference to the representations of the at least first and second business documents in a manner that shows the dominant-subordinate relationship between the two references;
  providing a document information display area;
  selecting the dominant reference;
  displaying information from the first business document in the information display area;
  selecting the subordinate reference; and
  displaying information from the second business document in the information display area.

7. A method of exchanging information in a manufacturing environment between a manufacturer and a customer, comprising the steps of:
  initiating a logical session between a customer and an application server;
  receiving from a customer a request for information;
  processing the request for information from the customer, including generating an extensible markup language document, passing the extensible markup language document to a selector component, processing header information on the extensible markup language document, and passing the extensible markup language document to an adapter component;
  transmitting the processed request for information to a remote back-office database server, including
    invoking a remote procedure call to a remote database system through a proxy object, and
    invoking an internet server application program interface component to pass the extensible markup language document to an integration component;
  receiving information from the back-office database server; and
  transmitting to the customer the information received.

* * * * *